US012650230B2

(12) United States Patent
Strange et al.

(10) Patent No.: US 12,650,230 B2
(45) Date of Patent: Jun. 9, 2026

(54) SECTIONAL MOUNTING SYSTEM FOR AN ASSEMBLY THAT IS CONVERTIBLE BETWEEN A FIRE PIT, GRILL, GRIDDLE, SMOKER AND/OR TABLE

(71) Applicants: James Cleveland Strange, Atlanta, GA (US); Robert Story, Leesburg, GA (US)

(72) Inventors: James Cleveland Strange, Atlanta, GA (US); Robert Story, Leesburg, GA (US)

(73) Assignee: James Cleveland Strange, Atlanta, GA (US)

( * ) Notice: Subject to any disclaimer, the term of this patent is extended or adjusted under 35 U.S.C. 154(b) by 516 days.

(21) Appl. No.: 18/177,721

(22) Filed: Mar. 2, 2023

(65) Prior Publication Data

US 2023/0250963 A1 Aug. 10, 2023

Related U.S. Application Data

(63) Continuation-in-part of application No. 17/155,417, filed on Jan. 22, 2021, now Pat. No. 11,879,642.

(Continued)

(51) Int. Cl.
| | |
|---|---|
| *F24B 1/182* | (2006.01) |
| *A47B 37/04* | (2006.01) |
| *A47J 37/07* | (2006.01) |

(52) U.S. Cl.
CPC .............. *F24B 1/182* (2013.01); *A47B 37/04* (2013.01); *A47J 37/0704* (2013.01); *A47J 37/0781* (2013.01); *A47J 37/0786* (2013.01)

(58) Field of Classification Search
CPC ... F24B 1/182; F24B 1/189; F24B 3/00; A47J 37/04; A47J 37/0704; A47J 37/0781;

(Continued)

(56) References Cited

U.S. PATENT DOCUMENTS

| | | | |
|---|---|---|---|
| 4,216,760 A | 8/1980 | Wiggins | |
| 5,183,027 A | 2/1993 | Saldana | |

(Continued)

FOREIGN PATENT DOCUMENTS

| | | |
|---|---|---|
| GB | 6004405 | 12/2016 |
| GB | 6093196 | 6/2020 |
| GB | 6152569 | 8/2021 |

OTHER PUBLICATIONS

Fire Sense Roman Fire Pit, first available Nov. 1, 2011 [online], [site visited Jun. 6, 2022]. Available from internet, URL: <https://www.amazon.ca/Fire-Sense-Roman-Pit/dp/B004A9CEOQ> (Year: 2011).

(Continued)

*Primary Examiner* — Alfred Basichas
(74) *Attorney, Agent, or Firm* — Eversheds Sutherland (US) LLP

(57) ABSTRACT

Systems and methods for providing a convertible fire pit, grill, griddle, smoker and table apparatus are provided. The apparatus is configured such that a user can readily, easily, and safely convert the apparatus between a fire pit, a grill, and a smoker without tools. The apparatus may include a bowl, a grill frame support, e.g., a ring, positionable about the bowl, a shelf attachable to the grill frame support, a grate positionable within the bowl, and a grill frame positionable about grill frame support. The grill frame may be configured to rotate about the bearings within the grill frame support. The apparatus may also include interchangeable grill components positionable about the grill frame and a hood disposed above the grill frame.

20 Claims, 39 Drawing Sheets

Related U.S. Application Data

(60) Provisional application No. 63/315,702, filed on Mar. 2, 2022.

(58) Field of Classification Search
CPC .... A47J 37/0786; A47J 33/00; A47J 37/0763; A47J 2037/0795
See application file for complete search history.

(56)                         References Cited

U.S. PATENT DOCUMENTS

| | | | |
|---|---|---|---|
| D382,633 | S | 8/1997 | Clemmer |
| D765,231 | S | 8/2016 | Horsfield |
| D790,677 | S | 6/2017 | Horsfield |
| D844,125 | S | 3/2019 | Horsfield |
| D845,455 | S | 4/2019 | Horsfield |
| 11,015,818 | B1 | 5/2021 | Ritchie et al. |
| 2019/0101292 | A1 | 4/2019 | Quigley |
| 2019/0159630 | A1 | 5/2019 | Salum |
| 2020/0139872 | A1 | 5/2020 | Bates et al. |
| 2021/0085126 | A1 | 3/2021 | Bartlett |
| 2021/0404663 | A1 | 12/2021 | Strange |

OTHER PUBLICATIONS

Office Action mailed Jun. 30, 2023 issued in related U.S. Appl. No. 17/155,417.

416

470

600

601

605

603

609

600

607

601

605

607

609

700

700

SECTIONAL MOUNTING SYSTEM FOR AN ASSEMBLY THAT IS CONVERTIBLE BETWEEN A FIRE PIT, GRILL, GRIDDLE, SMOKER AND/OR TABLE

CROSS-REFERENCE TO RELATED APPLICATIONS

The disclosure claims priority to and the benefit of U.S. Provisional Patent Application No. 63/315,703, filed Mar. 2, 2022, which is hereby incorporated by reference herein in its entirety.

This disclosure is a Continuation in Part of U.S. Non-Provisional Patent Application No. 17/155,417, filed Jan. 22, 2021, which is hereby incorporated by reference herein in its entirety.

FIELD OF THE DISCLOSURE

The disclosure generally relates to a convertible fire pit, grill, griddle, smoker and table apparatus. The present disclosure enables a user to readily, easily, and safely convert from one type of use to another without tools.

BACKGROUND

People routinely use fire pits, barbecue grills, and smokers in outdoor living spaces and while camping. Although these types of outdoor activities are very popular, many consumers prefer to own one or another, but not all three. For some, limited space or storage is an issue, for others the cost and assembly. Others may not want to have a substantial portion of their patio or green space occupied by various items. Yet another problem is for people who enjoy camping. They may consider taking a fire pit, grill, or smoker but will not take all three due to space limitations in transport and at the camp site.

Although there have been attempts to address the problems associated with different uses of a single device, many retain the issues discussed above. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
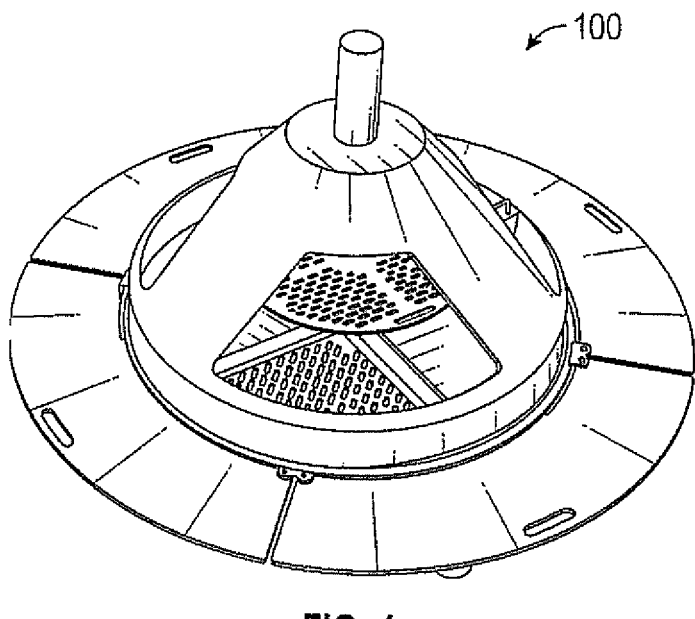
FIG. 1 illustrates an exemplary convertible fire pit, grill, griddle, smoker and/or table apparatus in accordance with one or more embodiments of the disclosure.

Some or all of the above needs and/or problems may be addressed by certain embodiments of the present disclosure. In some instances, the disclosure is directed to systems and methods for providing a convertible fire pit, grill, griddle, smoker, and table apparatus. The apparatus is configured such that a user can readily, easily, and safely convert the apparatus between a fire pit, a grill, and a smoker without tools.

The apparatus may include a bowl, a ring positionable about the bowl, a shelf attachable to the ring, a grate positionable within the bowl, and a grill frame positionable about ring. The grill frame may be configured to rotate about the ring. The apparatus may also include a grill component positionable about the grill frame and a hood disposed above the grill frame. The term grill component may refer to any attachment or accessory that allows the user to convert the apparatus between a fire pit, a grill, a griddle, a smoker, and a table In some instances, the bowl may include a support and a port. The support may include legs (e.g., three legs) extending from the bowl. The legs may provide support and stability to the bowl. The length of the legs also may be adjustable in order to adjust the height of the bowl. The port may include a pipe or the like extending from a lower portion of the bowl. The port may be configured to provide an air flow into the bowl. The air flow may be via natural convection or forced air via a blower or the like. The port may include a valve to selectively restrict the air flow into the bowl. In some instances, the bowl may include a gas connection for connecting a propane or natural gas supply to the bowl. Any suitable gas connection may be used herein.

The ring includes a bearing, a bushing, a shelf bracket, and a ledge. The ring is configured to nest on a lip of the bowl. The ring may be sized and shaped to correspond to the diameter of the bowl. In this manner, the ring may rest on the lip of the bowl. The bowl and lip may be any suitable size, shape, or configuration. Although described as a bowl and ring, in some instances, the bowl and ring may be rectangular or oblong in shape.

The bearing may include any suitable bearing capable of enabling the grill frame to rotate about the ring. In some instances, the bearing may include a number of ball bearings positioned on an inner diameter of the ring. For example, the ring may include a number of bearing brackets extending from an internal diameter of the ring. In some instances, the bearing brackets may extend from a lower edge of the ring such that the top side of the grill frame is substantially flush with the top side of the ring when the grill frame is disposed on the bearings. The bearings may be ball bearings or the like.

The bushing may include any suitable bushing capable reducing friction between the grill frame and the ring while keeping the grill frame centered about a vertical axis when the grill frame is being rotated. In some instances, the bushing may include a number of roller bushings positioned on an inner diameter of the ring. For example, there may be one or more bushings disposed on each of the bearing brackets so that the bushing is in between the outer diameter of the grill frame and the inner diameter of the ring. The bushing may be roller bushings or the like.

The grill frame may be configured to rotate about the bearings and bushings within the ring. In certain embodiments, the outer diameter of the grill frame may be less than or substantially the same as the inner diameter of the ring. In this manner, the grill frame may be configured to rotate within the ring. In some instances, the grill frame may include a handle or the like (e.g., a graspable protrusion) to facilitate rotation of the grill frame. In other instances, a user may simply engage the grill frame itself or a component attached thereto to rotate it.

The shelf bracket and ledge may extend outward away from the ring. In certain embodiments, the shelf bracket may extend from an upper portion of the ring, and the ledge may extend from a lower portion of the ring. The vertical space between the shelf bracket and the ledge may be sized and shaped to accommodate the thickness of the shelf In some instances, the shelf bracket may include two shelf brackets disposed on opposite sides of the ledge. In such instances, the shelf may include pins that are configured to engage holes in the shelf brackets. In this manner, the shelf is configured to be disposed on top of the ledge and beneath the two brackets such that the pins engage the holes in the shelf brackets and the shelf is secured to the ring. In some instances, the shelf is arcuate. In other instances, the shelf may be rectangular. The shelf may be any suitable size, shape, or configuration. In certain embodiments, the shelf may be include a hinge in order to fold a portion of the shelf. The shelf may include a handle.

The grate may include a number of holes therethrough. The grate is configured to sit within the bowl below the grill frame. In some instances, the grate includes dividers. The dividers may be any suitable size, shape, or configuration. The dividers are configured to partition the grate into multiple sections. Each section may accommodate the same or a different type or amount of fuel, such as wood, coal, charcoal, or the like. The dividers also may provide structural support to the grate. In some instances, the dividers may be integral to the grate. The dividers may include a handle in order to move and manipulate the grate. In some instances, the dividers and/or the grate may be omitted. The grate may also include one or more structure supports for providing additional structural integrity to the grate.

The grill frame may include an aperture. The aperture may be any suitable size, shape, or configuration. The aperture may be configured to accommodate the grill component. For example, the grill frame may include a number or apertures and a number of grill components. The grill components may be configured to interchangeably nest within the apertures. For example, each of the grill components may include a different type of cooking grid or surface. In this manner, a user may change (or "swap out") different grill components in each of the apertures. For example, some of the grill components may include various different types of grate grilling surfaces and patterns, while others may include stove top or griddle cooking surfaces. The grill components may be configured to rotate with the grill frame.

In some instances, each of the grill components may include a handle for removing and inserting the grill components into the apertures. In some instances, the grill frame may include a tab extending from a bottom portion of the grill frame into the aperture, and the grill components may be configured to rest on top of the tab such that the top surface of the grill frame is flush with the top surface of the grill components. In other instances, the grill components may include tabs that extend from the grill components and rest on top of and engage the grill frame.

In certain embodiments, the grill components may include a secondary grill, also referred to herein as a warming rack, spaced apart from the grill frame. The secondary grill may include a stand and a cooking surface. The stand may include one or more protrusions or legs configured to mate with one or more slots in the grill frame. The protrusions or leg may also rest directly on the ring.

The apparatus may include a hood. The hood may be configured to rest on the grill frame. In this manner, the hood may rotate with the grill frame. The hood may be removable. The hood may include apertures. In some instances, panels may be included to cover the apertures of the hood and enclose the hood. The hood may include a chimney. The hood may cover a portion of the grill frame. The hood may cover the entirety of the grill frame.

Illustrative Embodiments

Figure 2:
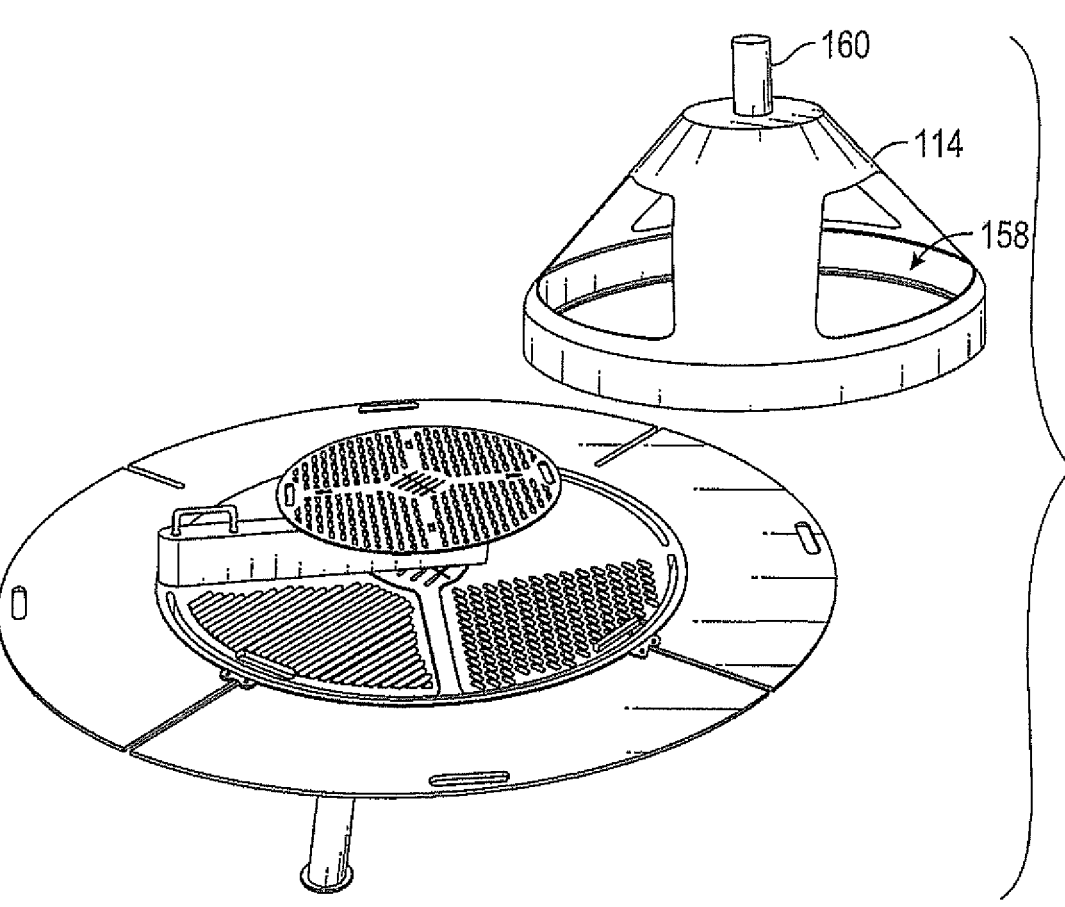
FIG. 2 illustrates the convertible fire pit, grill, griddle, smoker and/or table apparatus of FIG. 1 with the hood removed in accordance with one or more embodiments of the disclosure.

Referring now to the drawings, FIGS. 1-13 and FIGS. 23-27 depict exemplary embodiments of a convertible fire pit, grill, griddle, smoker and/or table apparatus. FIG. 1 illustrates apparatus 100 in an assembled configuration. The apparatus 100 may include the hood 114. The hood 114 may be configured to rest on the grill frame 110. In this manner, the hood 114 may rotate with the grill frame 110. The hood 114 may be removable, as shown in FIG. 2. The hood 114 may include apertures 158. The hood 114 may include a chimney 160.

Figure 3:
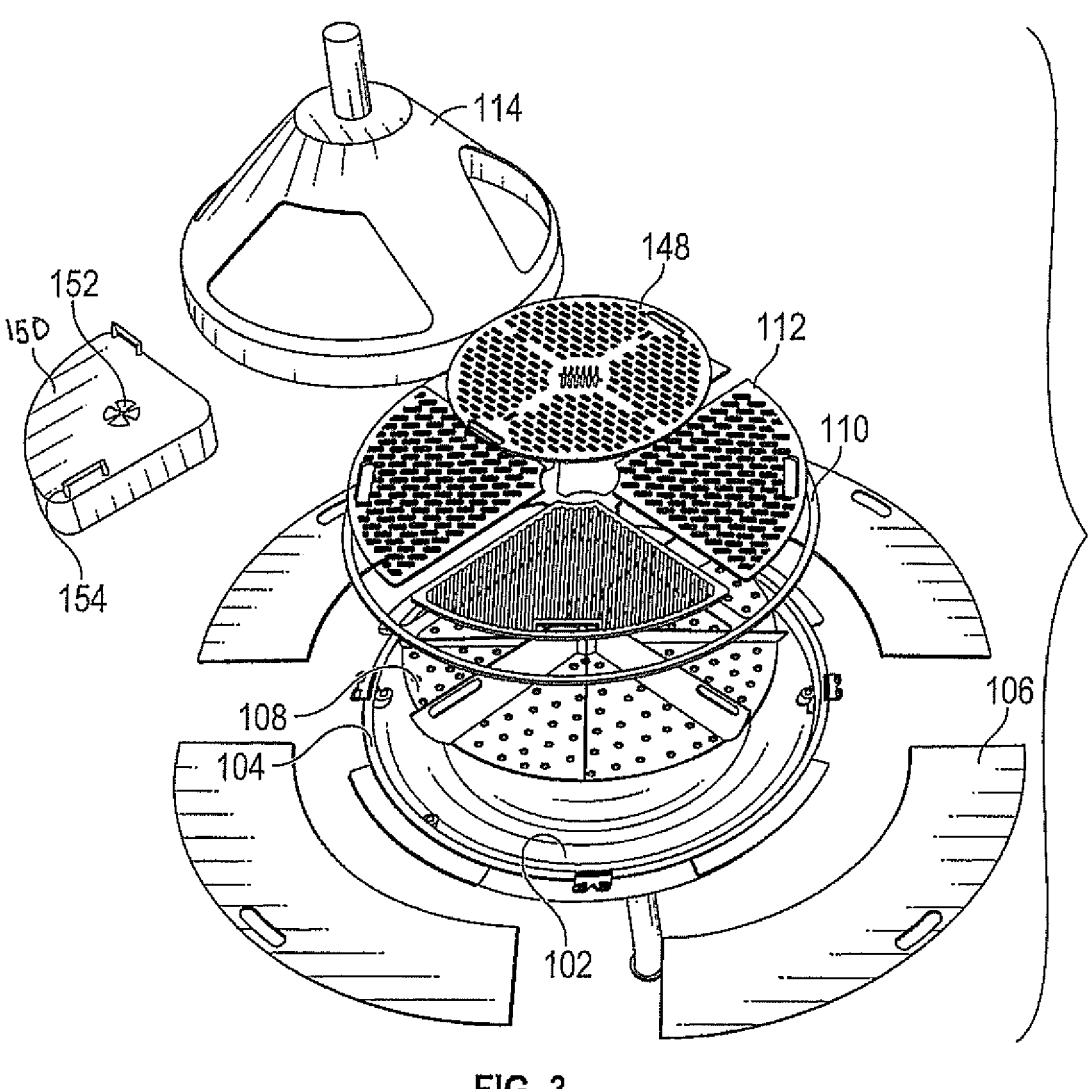
FIG. 3 is an exploded view of the convertible fire pit, grill, griddle, smoker and/or table apparatus of FIG. 1 in accordance with one or more embodiments of the disclosure.

Referring now to FIG. 3, apparatus 100 may include a bowl 102, a ring 104, also referred to herein as a grill frame support, positionable about the bowl 102, a shelf 106 attachable to the ring 104, a grate 108 positionable within the bowl 102, and a grill frame 110 positionable about ring 104. The grill frame 110 may be configured to rotate within the ring 104. The apparatus 100 may also include a grill component 112 positionable about the grill frame 110 and a hood 114 disposed above the grill frame 110. The grill component may be a single component with more than one cooking surface or cooking feature. On the other hand, there may be multiple grill components with different cooking surfaces or cooking features that may be interchangeable from one another.

In some instances, one or more grill hoods 150, 250, 450 may be provided. The grill hoods 150 may be configured to be positioned over one or more of the grill components 112. The grill hoods may include a ventilation port 152 (such as a daisy vent or the like) and one or more handles 154. More so, the grill hoods 150 may include a thermometer.

Figure 4:
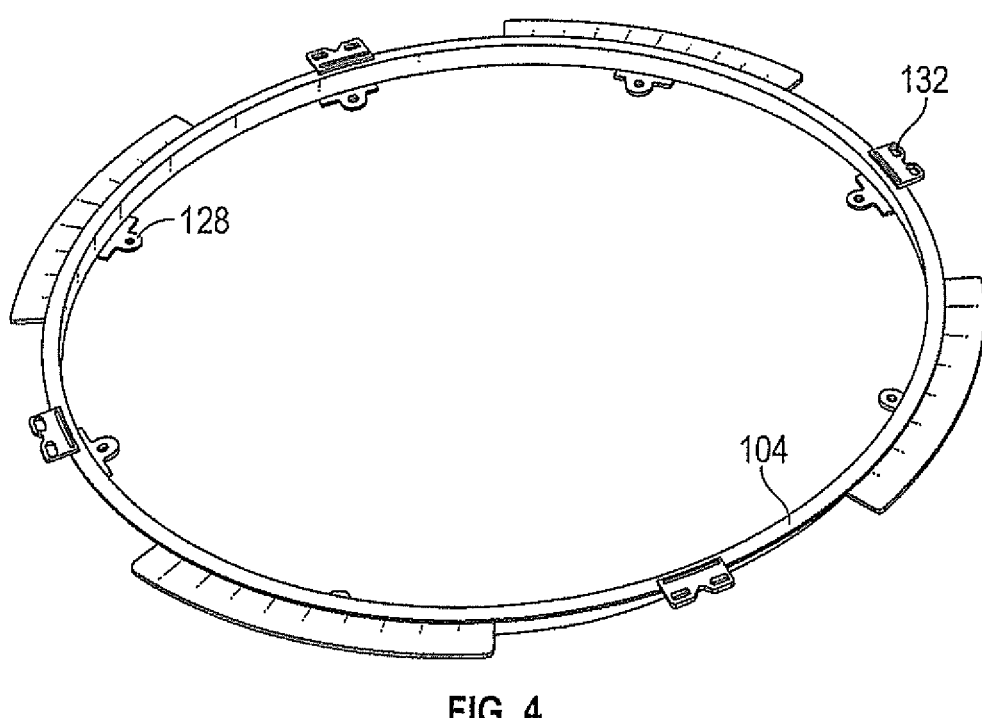
FIG. 4 illustrates an exemplary ring of the convertible fire pit, grill, griddle, smoker and/or table apparatus of FIG. 1 constructed in accordance with one or more embodiments of the disclosure.
Figure 5:
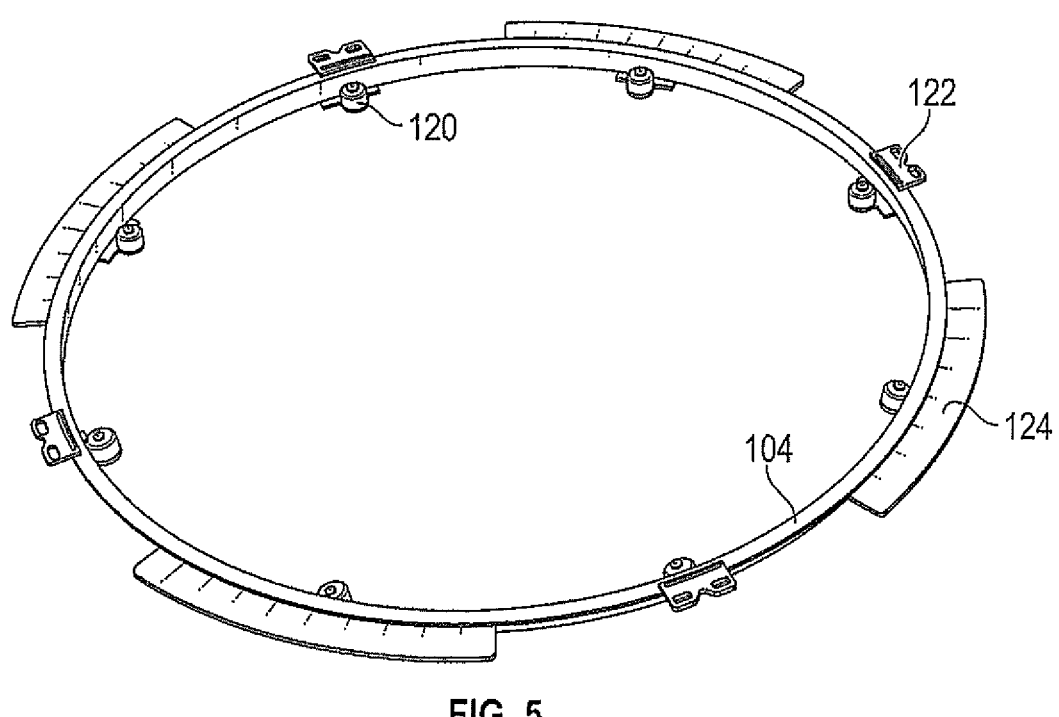
FIG. 5 illustrates the exemplary ring of FIG. 4 with a number of bearings in accordance with one or more embodiments of the disclosure.
Figure 6:
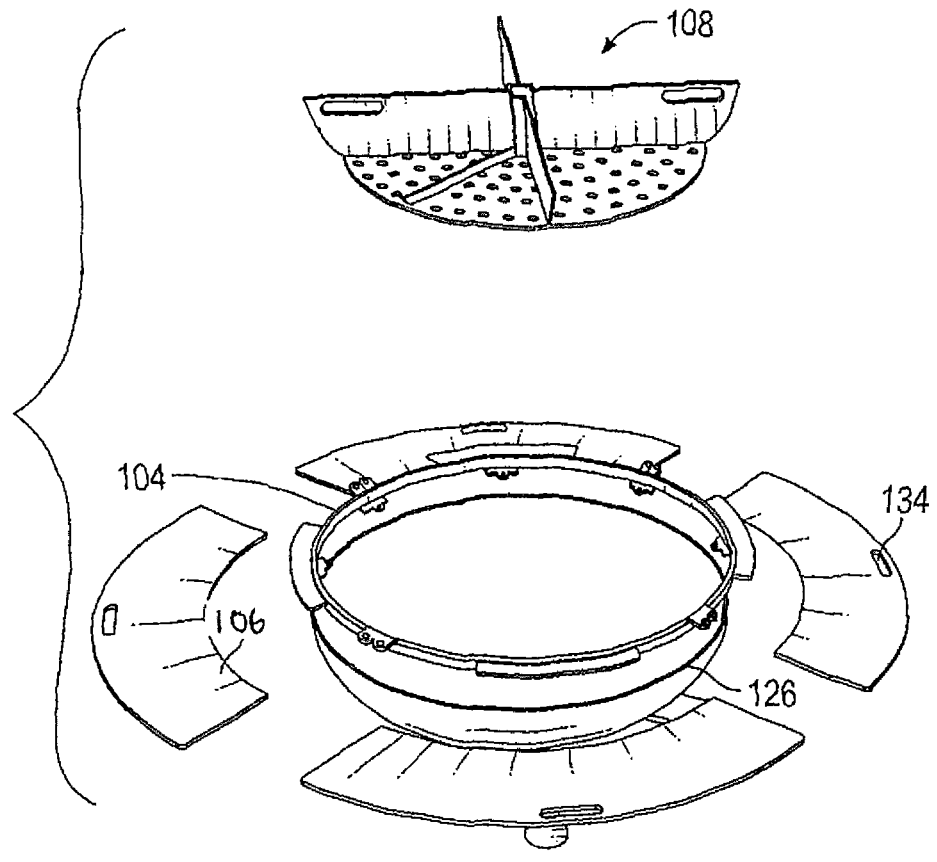
FIG. 6 is an exploded view of an exemplary bowl, ring, shelves, and grate in accordance with one or more embodiments of the disclosure.

As shown in FIGS. 4 and 5, the ring 104 includes a bearing 120, a bearing bracket 128, a shelf bracket 122, and a ledge 124. The ring 104 is configured to nest on a lip 126 of the bowl 102. For example, the ring 104 may include a channel or the like configured to mate with the lip 126 of the bowl 102. The ring 104 may be sized and shaped to correspond to the diameter of the bowl 102. In this manner, the ring 104 may rest on the lip 126 of the bowl 102, as shown in FIG. 6. The bowl 102 and lip 126 may be any suitable size, shape, or configuration. Although described as a bowl and ring, in some instances, the bowl 102 and ring 104 may be rectangular or oblong in shape. Other shapes are envisioned as well. In other instances, the ring and bowl may be a unitary structure.

The bearing 120 may include any suitable bearing capable of enabling the grill frame 110 to rotate about the ring 104. In some instances, the bearing 120 may include a number of ball bearings or transfer bearings positioned on an inner diameter of the ring 104 (or the bowl). For example, the ring 104 may include a number of bearing brackets 128 extending from an internal diameter of the ring 104. In some instances, the bearing brackets 128 may extend from a lower edge of the ring 104 such that the top side of the grill frame 110 is substantially flush with the top side of the ring 104 when the grill frame 110 is disposed on the bearings 120. The bearings 120 may be ball bearings or the like.

Referring again to FIG. 5, the shelf bracket 122 and ledge 124 may extend outward away from the ring 104. In certain embodiments, the shelf bracket 122 may extend from an upper portion of the ring 104, and the ledge 124 may extend from a lower portion of the ring 104, or vice versa. The vertical space between the shelf bracket 122 and the ledge 124 may be sized and shaped to accommodate the thickness of the shelf 106. In some instances, the shelf bracket 122 may include two shelf brackets disposed on opposite sides of the ledge 124. In such instances, the shelf 106 may include pins 230 that are configured to engage holes 132 in the shelf brackets 122. In this manner, the shelf 106 is configured to be disposed on top of the ledge 124 and beneath the two shelf brackets 122 such that the pins 230 engage the holes 132 in the shelf brackets 122 and the shelf 106 is secured to the ring 104. In some instances, the shelf 106 is arcuate. In other instances, the shelf 106 may be rectangular or trapezoidal. The shelf 106 may be any suitable size, shape, or configuration. In certain embodiments, the shelf 106 may include a hinge in order to fold a portion of the shelf. The shelf 106 may include a shelf handle 134. Any number of shelves may be used herein. For example, the apparatus 100 may include 1, 2, 3, 4, 5, 6, 7, 8, and so on number of shelves.

Figure 7:
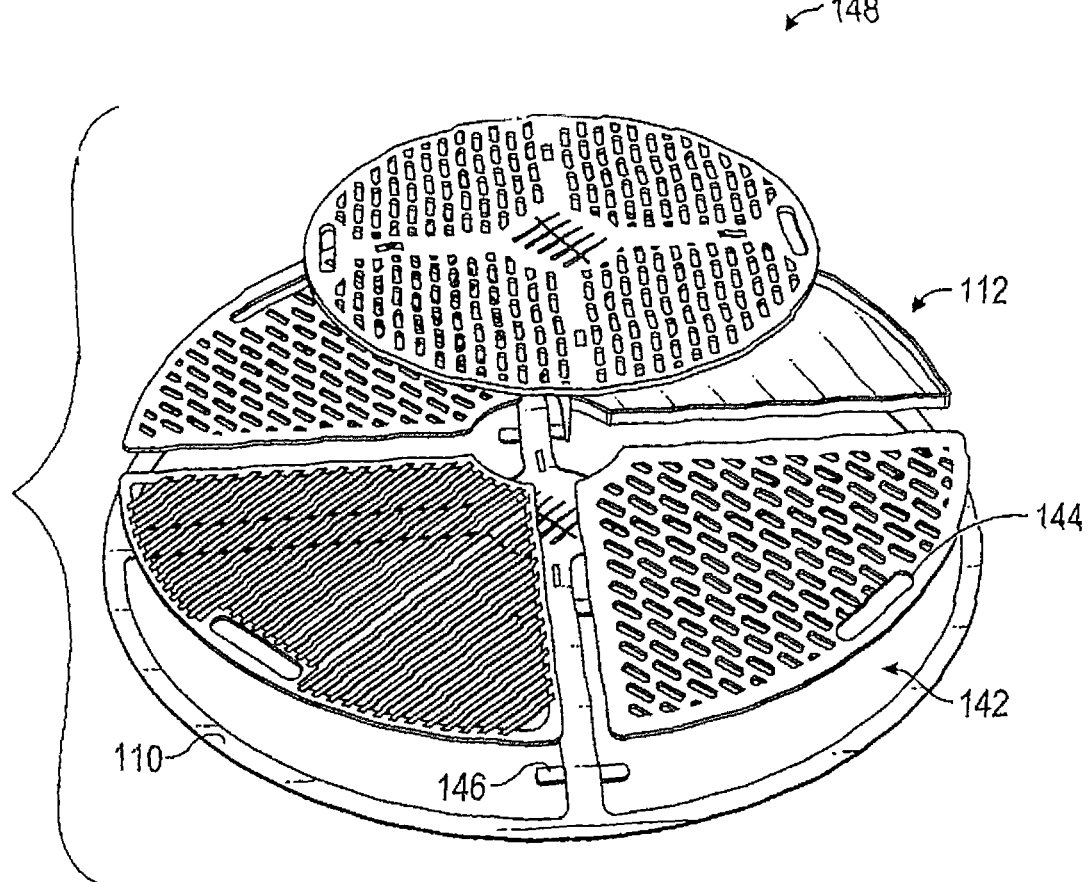
FIG. 7 is an exploded view of an exemplary grill frame, grill components, and secondary grill constructed in accordance with one or more embodiments of the disclosure.

Referring now to FIG. 7, the grill frame 110, the grill components 112, and the secondary grill 148 are provided. The grill frame 110 may be configured to rotate about the bearings 120 within the ring 104. In certain embodiments, the outer diameter of the grill frame 110 may be less than or substantially the same as the inner diameter of the ring 104. In this manner, the grill frame 110 may be configured to rotate within the ring 104. In some instances, the grill frame 110 may include a handle 144 or the like (e.g., a graspable protrusion) to facilitate rotation of the grill frame 110. In other instances, a user may simply engage the grill frame 110 itself (or a handle of the grill frame 110) or a component attached thereto to rotate it. In certain embodiments, the grill frame 110 may be omitted, and the grill components 112 may sit directly on the bearings 120.

Figure 26:
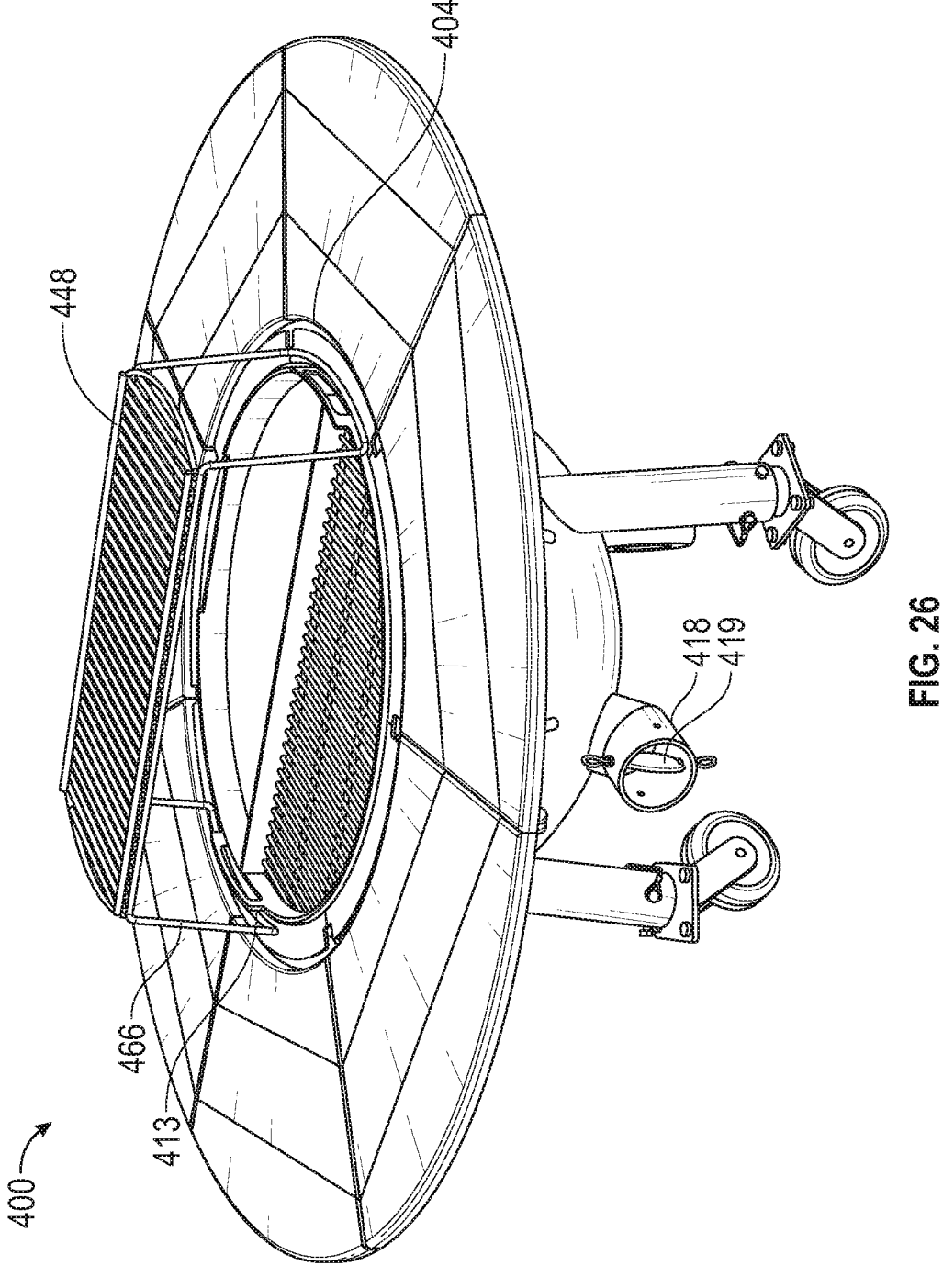
FIG. 26 illustrates the convertible fire pit, grill, griddle, smoker and/or table apparatus of FIG. 23 with the warming rack in accordance with one or more embodiments of the disclosure.

Referring to FIG. 26, another embodiment of the grill frame 410, the grill components 412, and the secondary grill 448 is provided. The grill frame 410 and the grill components 412 may be constructed similarly to the grill frame 110 and the grill components 112. The secondary grill, or warming rack, 448 may have two or more legs or protrusions 466 that rest directly on the ring 404. In such an embodiment, the secondary grill may remain stationary while the grill frame 410 rotates. One skilled in the art would understand that the protrusions 466 may also rest on the grill component 412 so that the secondary grill 448 rotates with the grill frame.

The grill frame 110 may include an aperture 142. The aperture 142 may be any suitable size, shape, or configuration. The grill frame 110 may include a single aperture, as shown by aperture 442 in FIG. 23, or multiple apertures. For example, the grill frame 110 may include 1, 2, 3, 4, 5, 6, 7, 8, and so on number of apertures 142. The aperture 142 may be configured to accommodate the grill component 112. For example, the grill frame 110 may include a number of apertures 142 and a number of grill components 112. The grill components 112 may be configured to interchangeably nest within the apertures 142. For example, each of the grill components 112 may include a different type of cooking grid or surface. In this manner, a user may change (or "swap out") different grill components 112 in each of the apertures 142. For example, some of the grill components 112 may include various different types of grate grilling surfaces and patterns, while others may include stove top or griddle cooking surfaces. The grill components 112 may be configured to rotate with the grill frame 110. In some instances, the grill components 112 may include a single grill component configured to nest directly on the bearings 120 to rotate thereon.

Figure 29A:
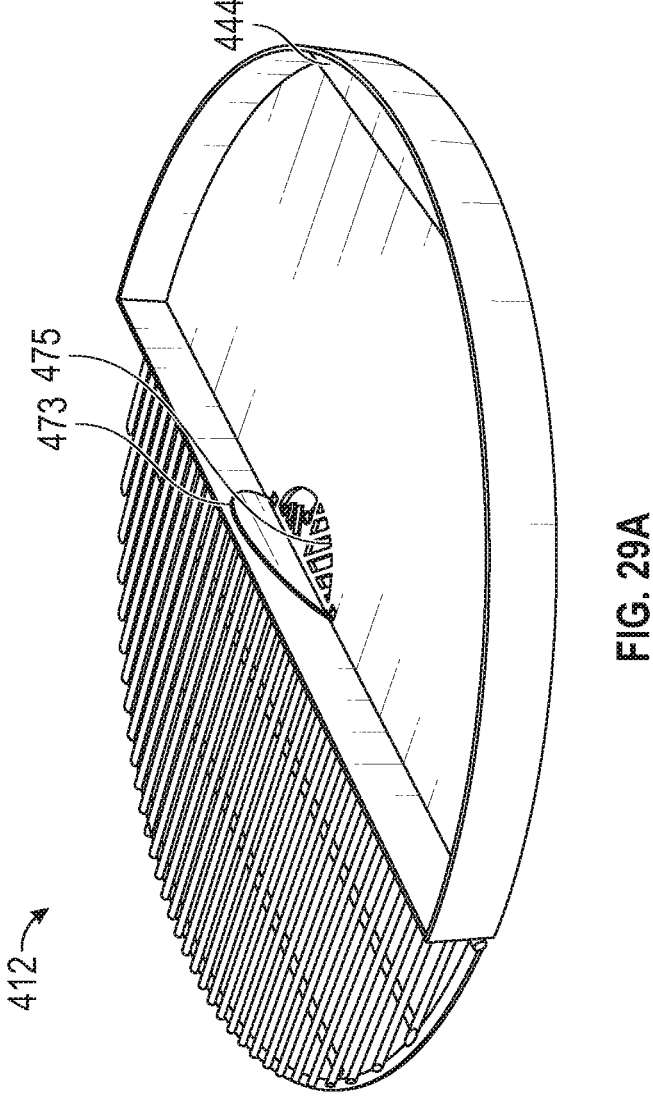
FIG. 29A depicts the grilling component of FIG. 23 with the grease aperture cover in the open position in accordance with one or more embodiments of the disclosure.
Figure 29B:
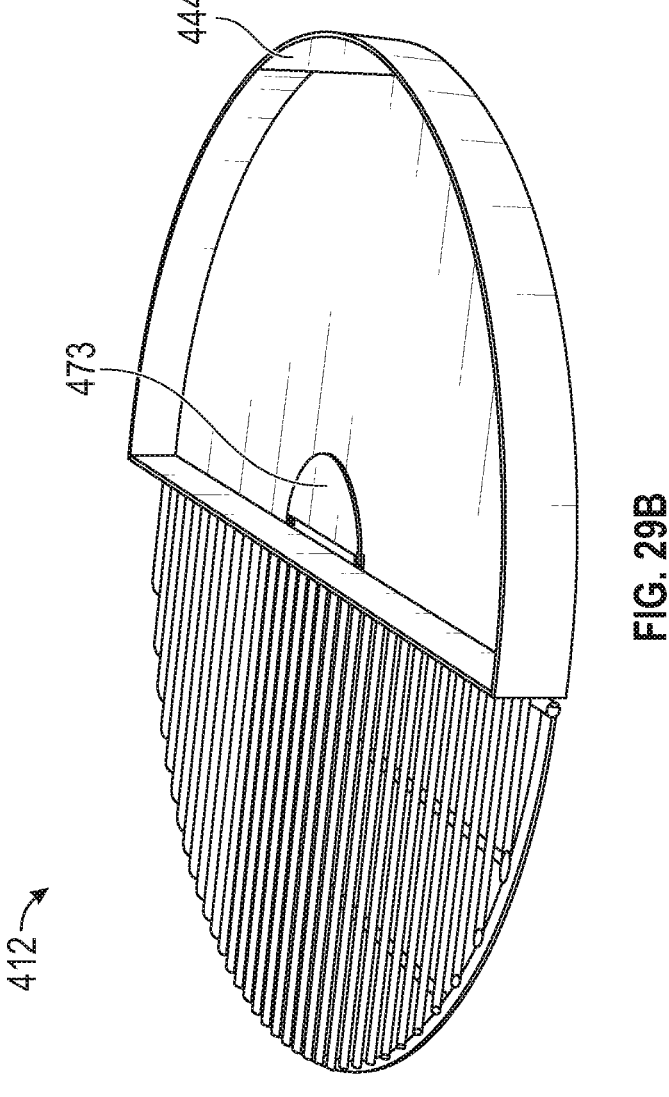
FIG. 29B depicts the grilling component of FIG. 23 with the grease aperture cover in the closed position in accordance with one or more embodiments of the disclosure.

In some instances, each of the grill components 112 may include a grill component handle 144 for removing and inserting the grill components 112 into the apertures 142. In some instances, the grill frame 110 may include a tab 146 extending from a bottom portion of the grill frame 110 into the aperture 142, and the grill components 112 may be configured to rest on top of the tab 146 such that the top surface of the grill frame 110 is substantially flush with the top surface of the grill components 112. In other instances, the grill components 112 may include tabs that extend from the grill components 112 and rest on top of and engage the grill frame 110. As shown in FIGS. 29A and 29B, the grill component 412 may be a unitary piece. In such an embodiment, there may be a single handle 444 used to engage the grill component 412.

Figure 8:
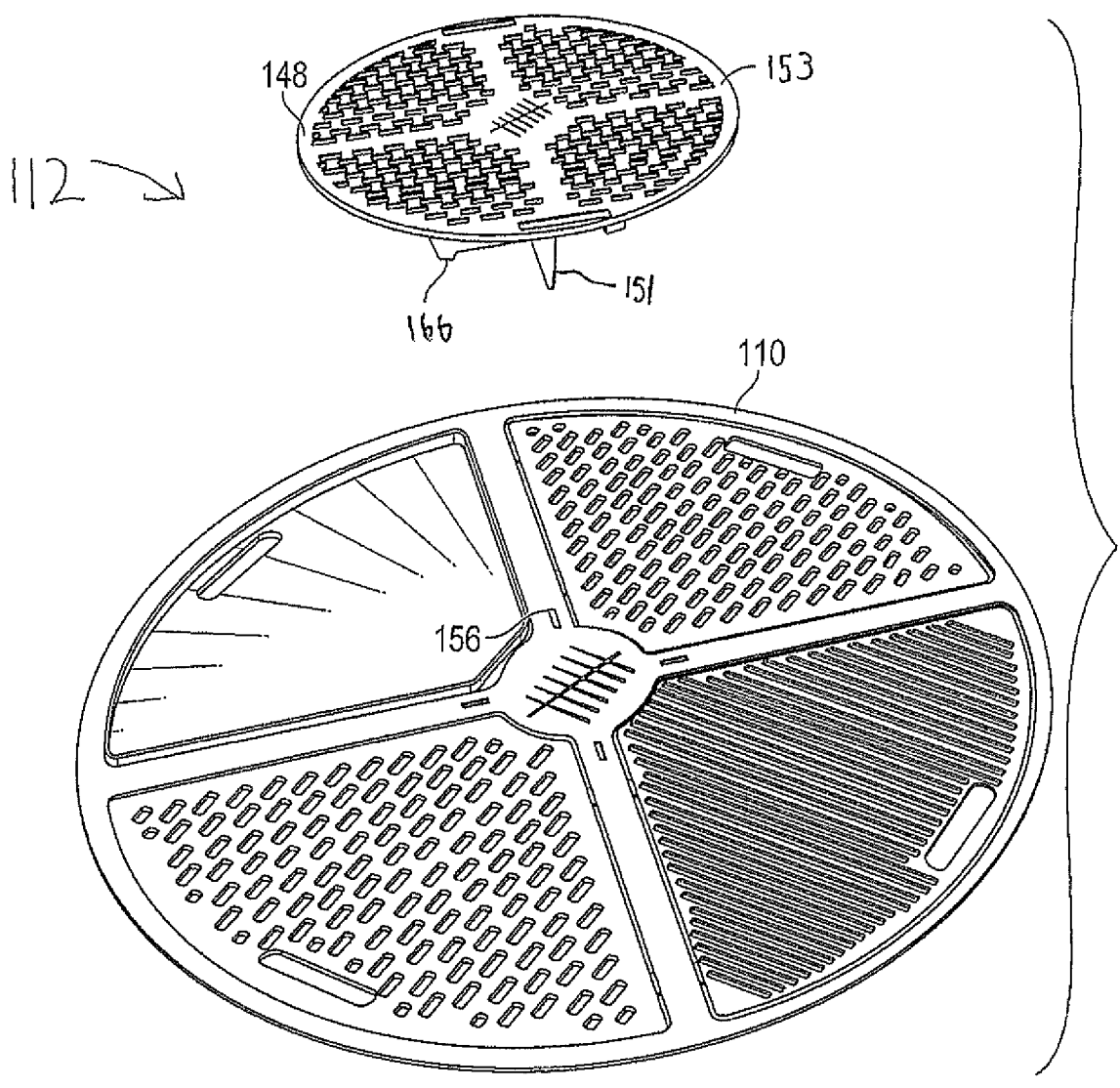
FIG. 8 illustrates another view of the exemplary grill frame, grill components, and secondary grill of FIG. 7 in accordance with one or more embodiments of the disclosure.
Figure 9:
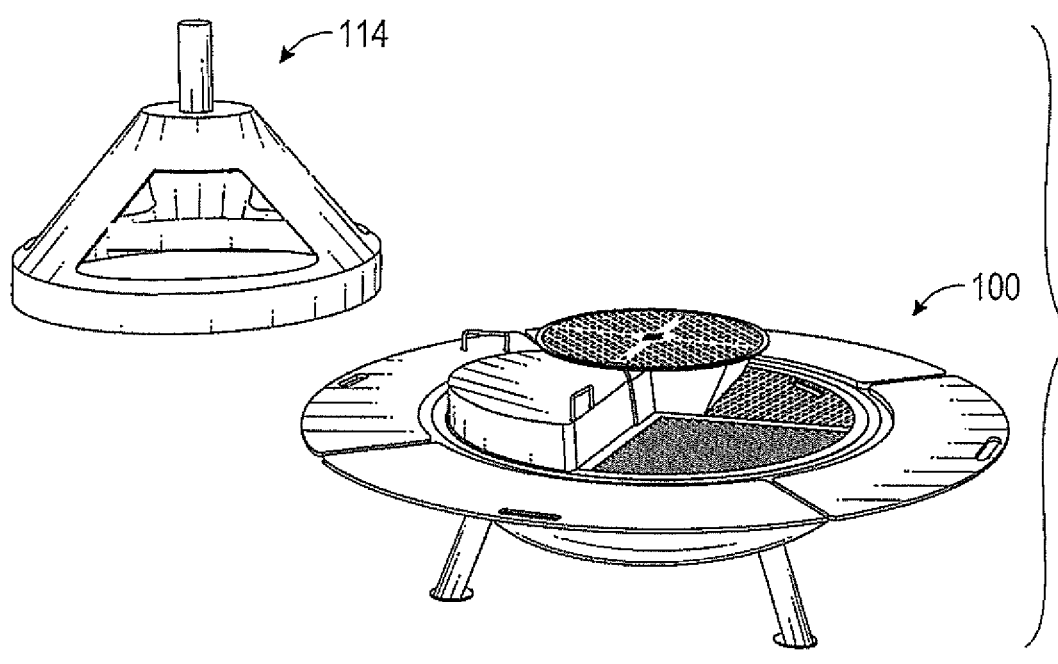
FIG. 9 illustrates another view of the convertible fire pit, grill, griddle, smoker and/or table apparatus of FIG. 1 with the hood removed in accordance with one or more embodiments of the disclosure.

As shown in FIG. 8, the grill components 112 may include a secondary grill 148 spaced apart from the grill frame 110. The secondary grill 148 may include a stand 151 and a cooking surface 153. The stand 151 may include one or more protrusions 166 configured to mate with one or more slots 156 in the grill frame 110, as shown in FIG. 9.

Figure 10:
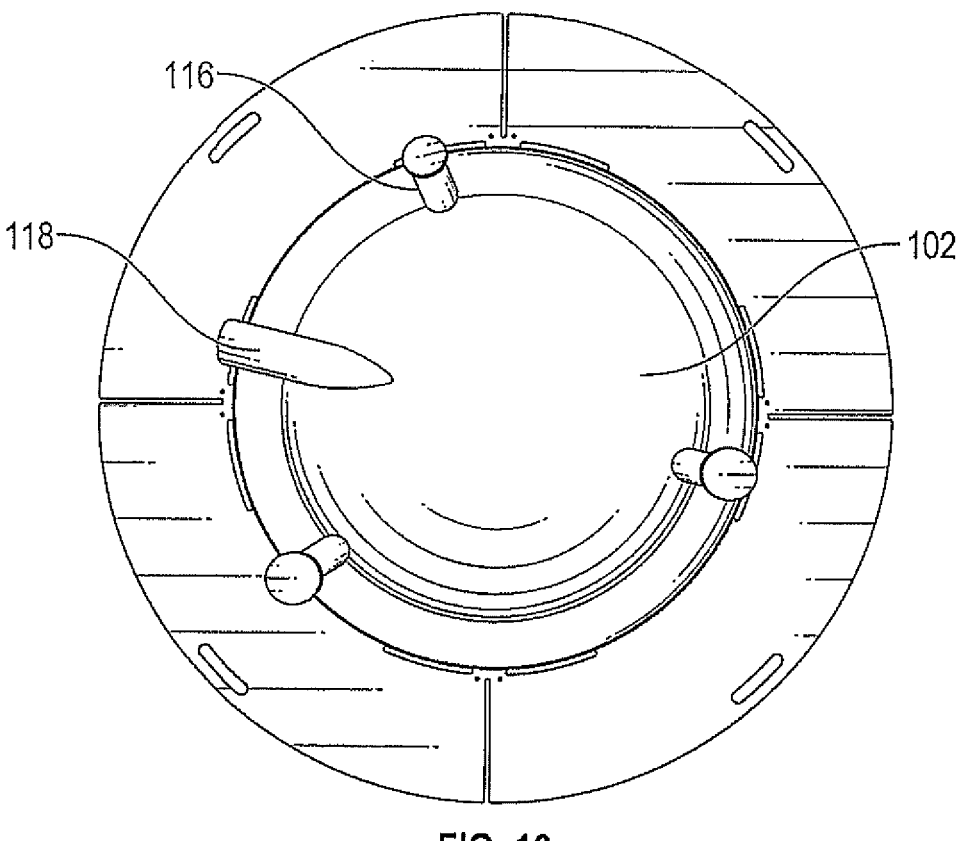
FIG. 10 illustrates a bottom view of the convertible fire pit, grill, griddle, smoker and/or table apparatus of FIG. 1 in accordance with one or more embodiments of the disclosure.
Figures 11, 12:
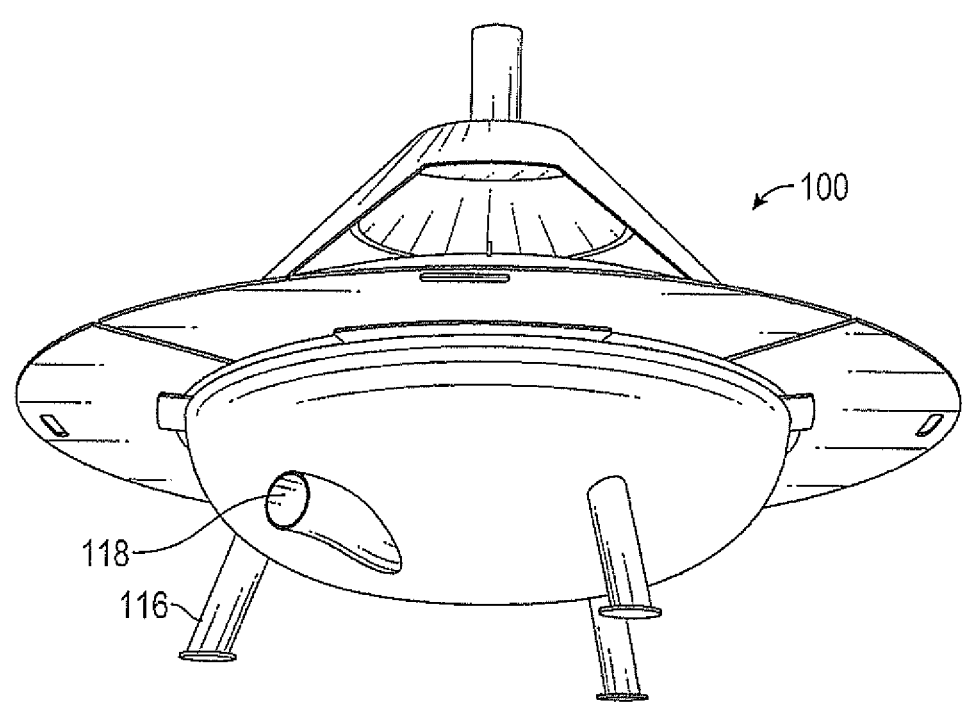
FIG. 11 illustrates a bottom side view of the convertible fire pit, grill, griddle, smoker and/or table apparatus of FIG. 1 in accordance with one or more embodiments of the disclosure.
FIG. 12 illustrates an exemplary grate constructed in accordance with one or more embodiments of the disclosure.
Figure 13:
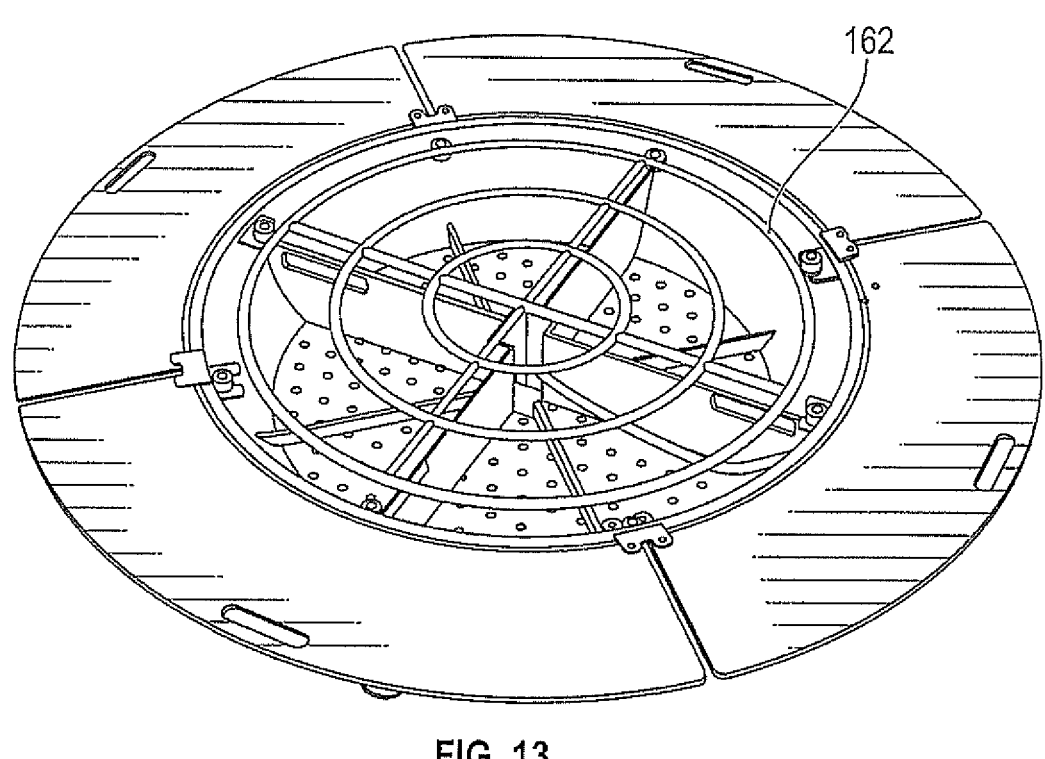
FIG. 13 illustrates an exemplary gas insert in accordance with one or more embodiments of the disclosure.
Figure 30:
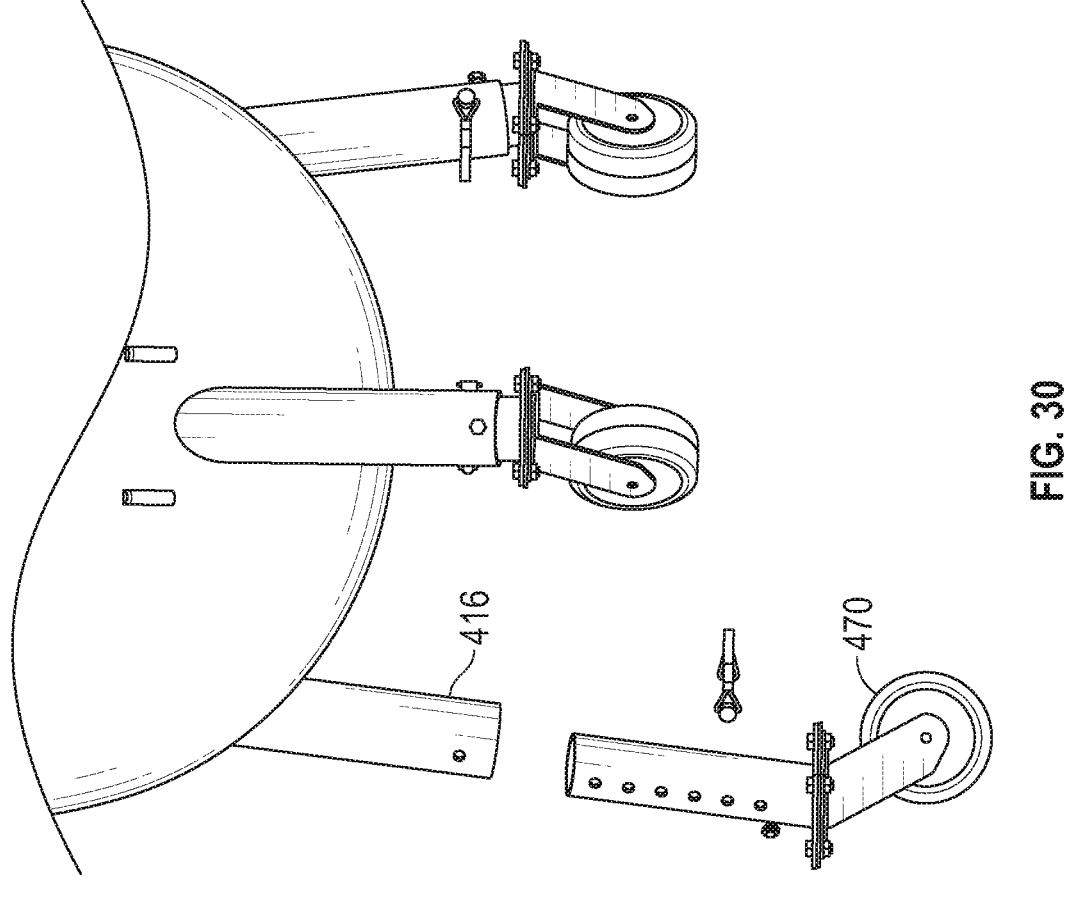
FIG. 30 depicts the supports of the apparatus of FIG. 23 in accordance with one or more embodiments of the disclosure.

As shown in FIGS. 10 and 11, the bowl 102 may include a support 116 and a port 118. The support 116 may include legs (e.g., three legs) extending from the bowl 102. The legs may be any suitable size, shape, or configuration. The legs may provide support and stability to the bowl 102. The length of the legs may also be adjustable in order to adjust the height of the grill frame and/or shelves as shown by the supports 416 and the castor wheels 470 in FIG. 30. Any number of legs may be used herein. The port 118 may include a pipe or the like extending from a lower portion of the bowl 102. The port 118 may be configured to provide an air flow into the bowl 102. The air flow may be via natural convection or forced air via a blower or the like. In some instances, the bowl 102 may include a gas connection for connecting a propane or natural gas supply to the bowl 102. Any suitable gas connection may be used herein. In this manner, the gas insert 162 may be disposed within the bowl 102 above the dividers 136 for providing gas functionality to the apparatus 100, as shown in FIG. 13.

Figure 23:
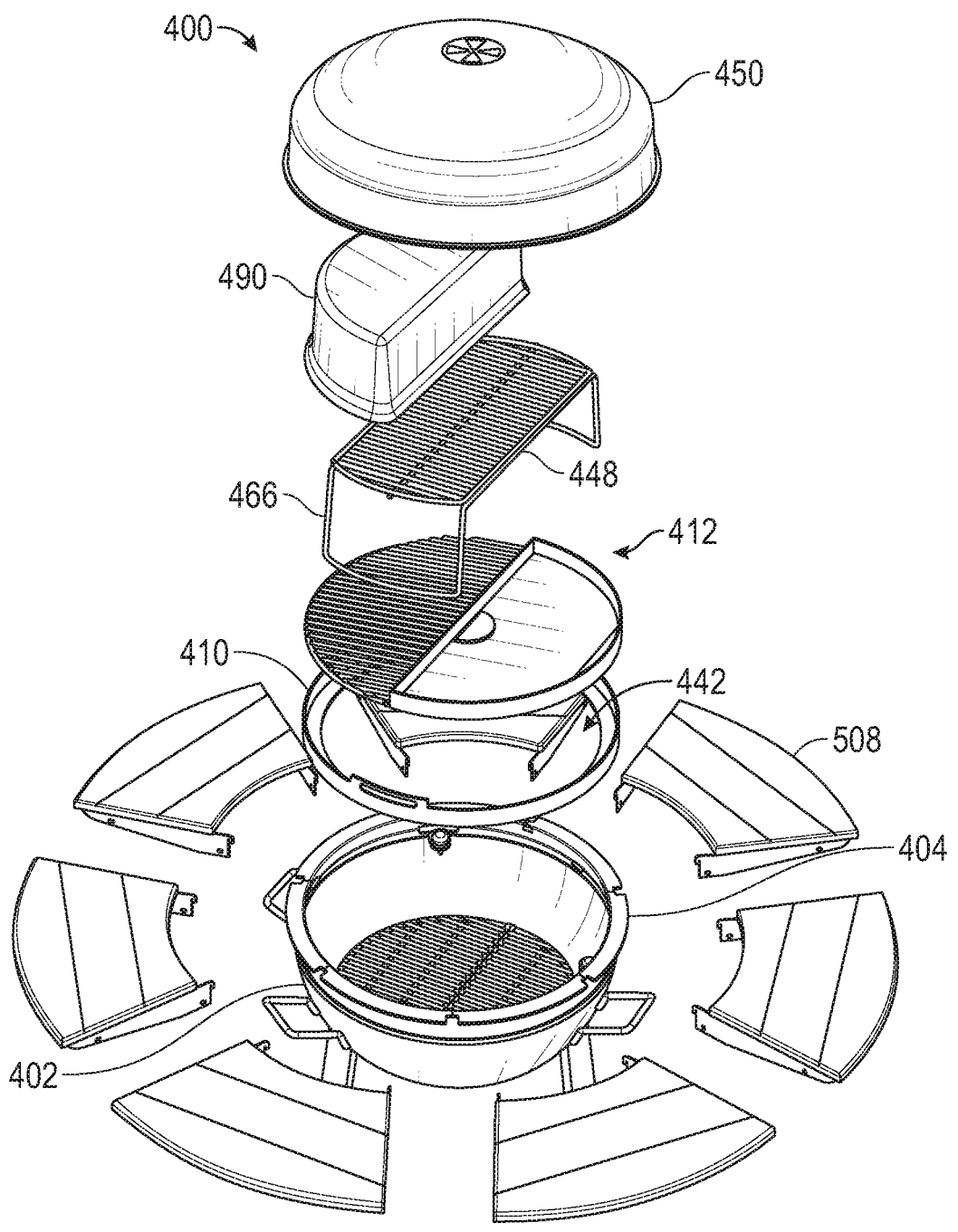
FIG. 23 is an exploded view of an exemplary grill frame, grill components, and secondary grill constructed in accordance with one or more embodiments of the disclosure.
Figure 28:
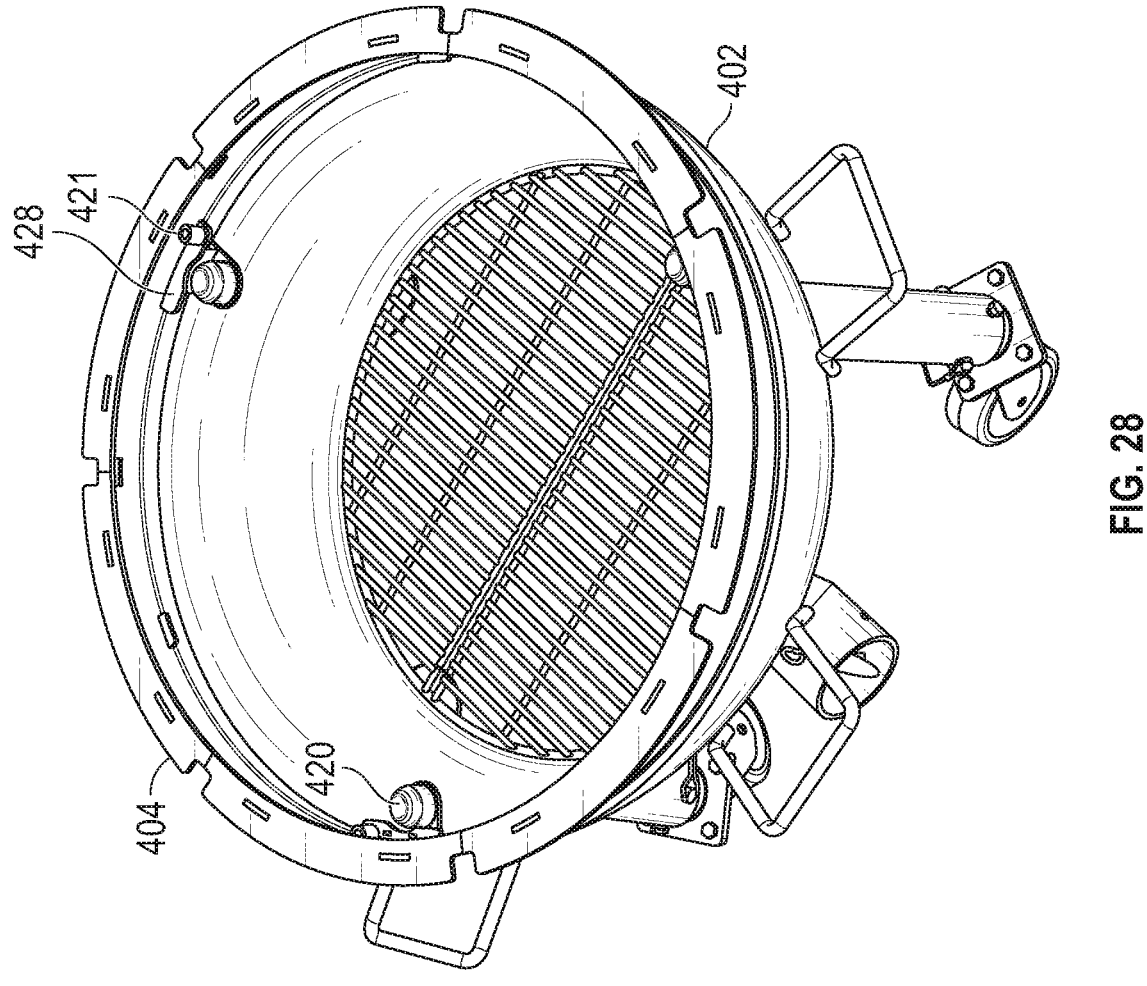
FIG. 28 illustrates the convertible fire pit, grill, griddle, smoker and/or table apparatus of FIG. 23 with the hood and grilling component removed in accordance with one or more embodiments of the disclosure.

As shown in FIG. 12, the grate 108 may include a number of holes therethrough. The grate 108 is configured to sit within the bowl 102 below the grill frame 110. In some instances, the grate 108 includes dividers 136. The dividers 136 may be any suitable size, shape, or configuration. The dividers 136 are configured to partition the grate 108 into multiple sections. Each section may accommodate the same or a different type or amount of fuel, such as wood, coal, charcoal, or the like. The dividers 136 also may provide structural support to the grate 108. In some instances, the dividers 136 may be integral to the grate 108. The dividers 136 may include a handle 138 in order to move and manipulate the grate 108. In some instances, the dividers 136 may be omitted as shown in FIGS. 23 and 28. The grate 108 may also include one or more structure supports 140 for providing additional structural integrity to the grate.

Figure 14:
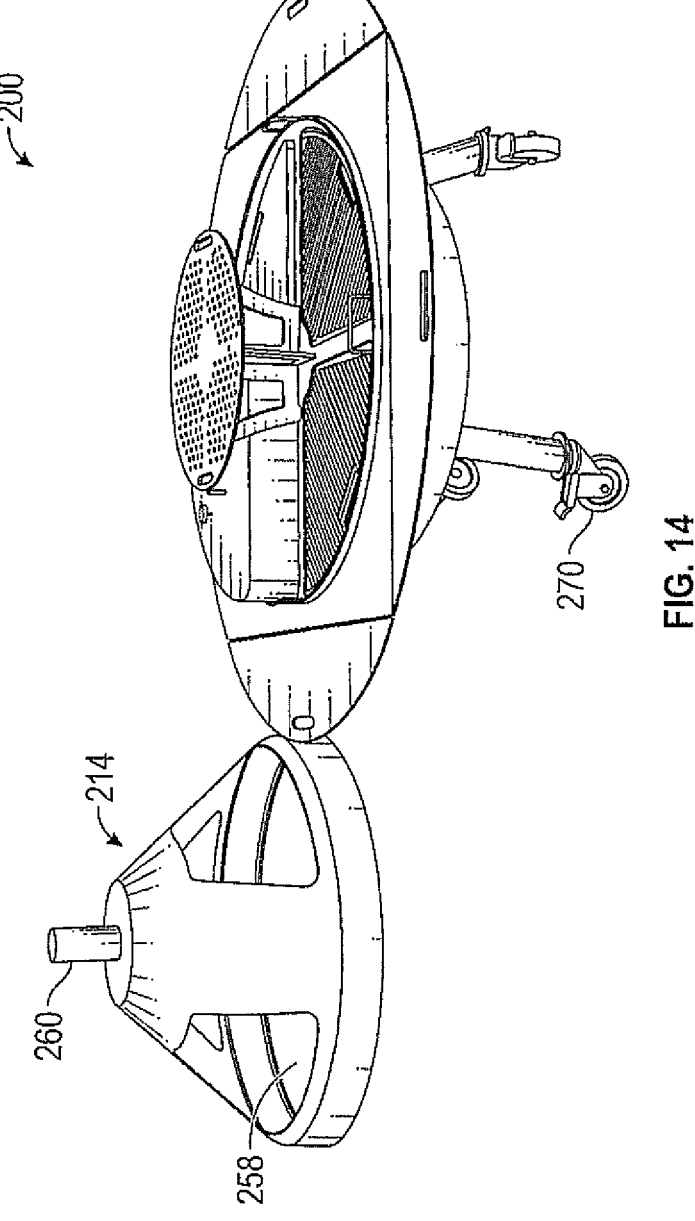
FIG. 14 illustrates another exemplary convertible fire pit, grill, griddle, smoker and/or table apparatus in accordance with one or more embodiments of the disclosure.
Figure 15:
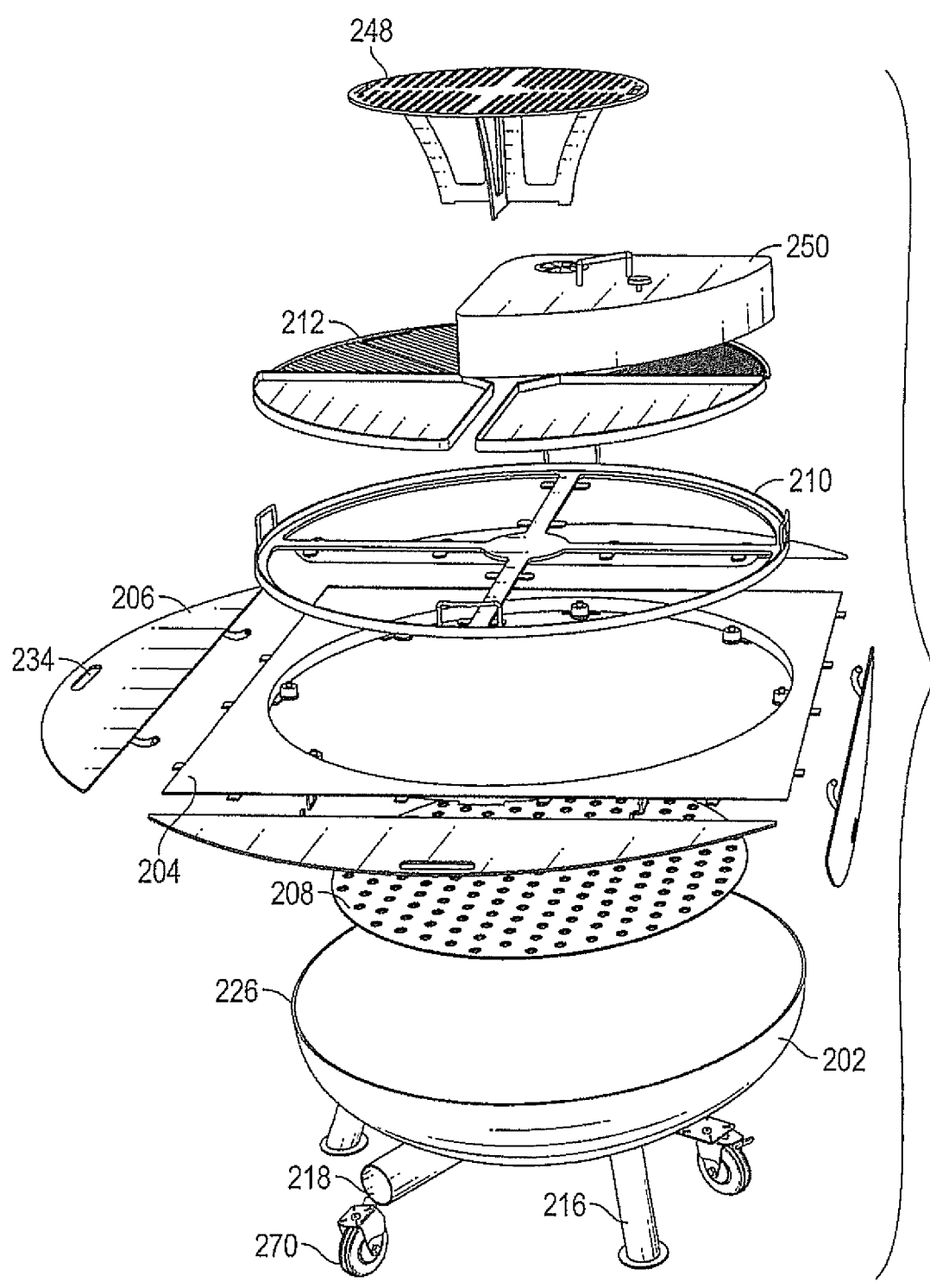
FIG. 15 is an exploded view of the exemplary convertible fire pit, grill, griddle, smoker and/or table apparatus of FIG. 14 in accordance with one or more embodiments of the disclosure.

Referring now to FIG. 14, another exemplary convertible fire pit, grill, griddle, smoker and/or table apparatus is provided. Apparatus 200 may be constructed similar to the apparatus 100 described above. For example, as shown in FIG. 14, the apparatus 200 may include a hood 214 having a chimney 260 and apertures 258, which may be constructed similar to the hood 114 having the chimney 160 and apertures 158. Moreover, as shown in FIG. 15, the apparatus 200 may include a bowl 202 having a support 216, e.g., one or more legs, and a port 218 for providing an air flow into the bowl 202, which may be constructed similar to the bowl 102 having the support 116 and the port 118. As shown in FIG. 15, the support 216 further may include castor wheels 270 for providing mobility to apparatus 200. The castor wheels 270 may be removably attached to the one or more legs of the support 216, and may include a braking mechanism to fix the castor wheels 270, and accordingly the apparatus 200, in a stationary position relative to the ground.

Figure 16:
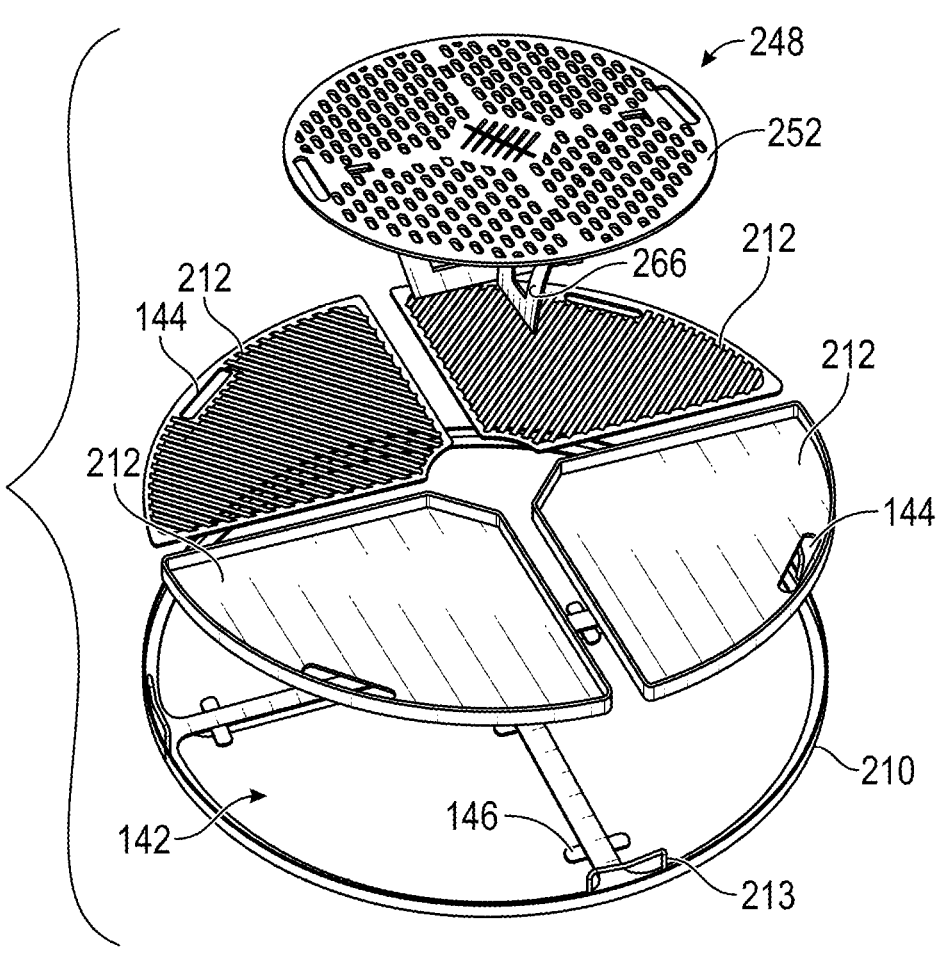
FIG. 16 is an exploded view of another exemplary grill frame, grill components, and secondary grill constructed in accordance with one or more embodiments of the disclosure.

Moreover, as shown in FIG. 16, the apparatus 200 may include a grill frame 210, grill components 212, a grill hood 250, and a secondary grill 248, which may be constructed similar to the grill frame 110, grate components 112, the grill hood 150, and the secondary grill 148. As shown in FIG. 16, the grill frame 210 further may include handles 213 in order to move and manipulate the grill frame 210. For example, the handles 213 may include two handles on opposite edges extending upward from the upper surface of the grill frame 210.

Figure 17:
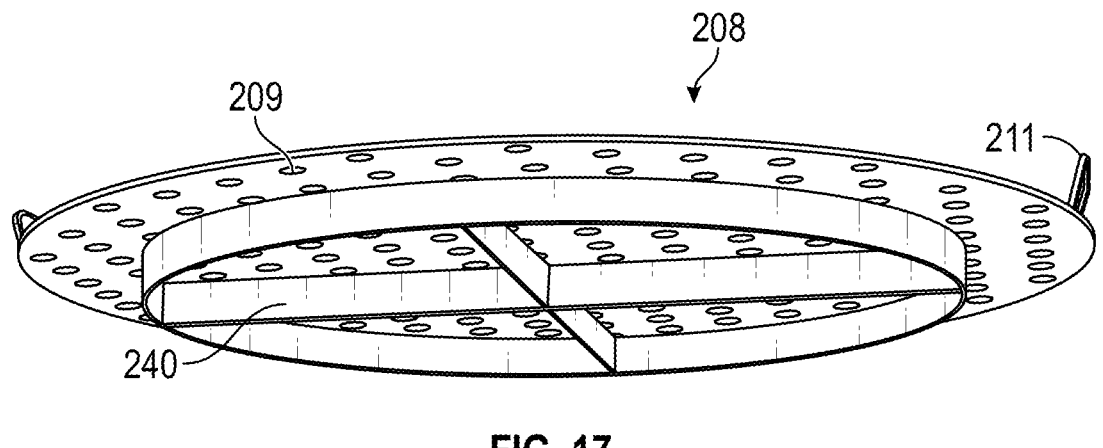
FIG. 17 illustrates another exemplary grate constructed in accordance with one or more embodiments of the disclosure.

The apparatus 200 may differ from the apparatus 100 in that the apparatus 200 may include a grate 208 instead of the grate 108, as shown in FIG. 17. Like the grate 108, the grate 208 may include a number of holes 209 therethrough. The grate 208 is configured to sit within the bowl 202 below the grill frame 210. The grate 208 further may include handles 211 in order to move and manipulate the grate 208. For example, the handles 211 may include two handles on opposite edges of the top surface of the grate 208. Unlike the grate 108, the grate 208 may not include dividers. The grate 208 also may include one or more structure supports 240 for providing additional structural integrity to the grate. As shown in FIG. 17, the one or more structure supports 240 may extend along a bottom surface of the grate 208, and may have include two support structures extending perpendicular to each other. The support 240 further may include a circular support structure, such that the perpendicular support structures extend within the circular support structure, thereby providing additional support to the grate 208.

Figure 18:
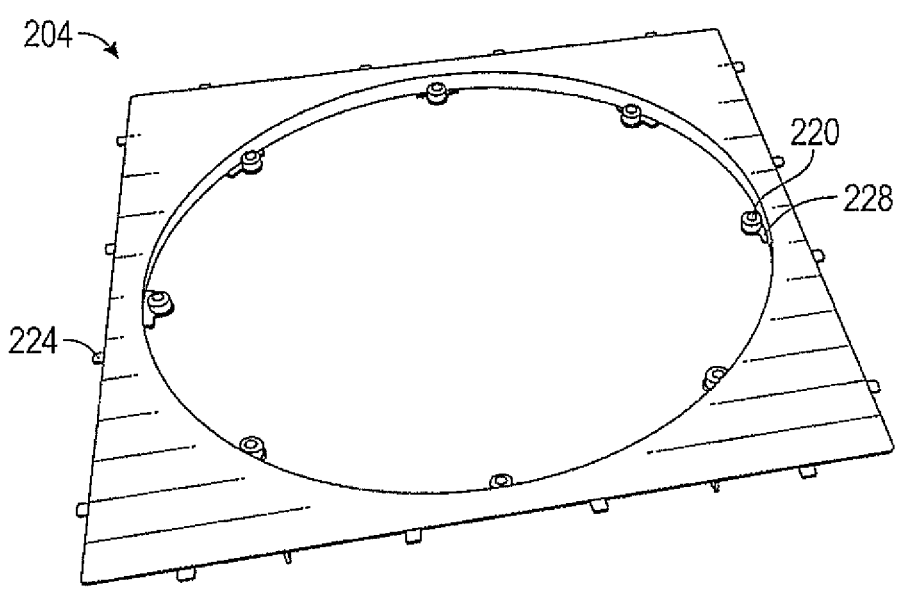
FIG. 18 illustrates an exemplary grill frame support constructed in accordance with one or more embodiments of the disclosure.

Moreover, the apparatus 200 may differ from the apparatus 100 in that the apparatus 200 may include a grill frame support 204 instead of the ring 104, as shown in FIG. 18. Like the ring 104, the grill frame support 204 may have a circular aperture. The grill frame support 204 is configured to nest on a lip 226 of the bowl 202. For example, the grill frame support 204 may include a channel or the like extending along the aperture configured to mate with the lip 226 of the bowl 202. The aperture of the grill frame support 204 may be sized and shaped to correspond to the diameter of the bowl 202. In this manner, the grill frame support 204 may rest on the lip 226 of the bowl 202. The bowl 202 and the lip 226 may be any suitable size, shape, or configuration. Although described as a bowl and circular aperture, in some instances, the bowl 202 and the aperture of the grill frame support 204 may be rectangular or trapezoidal in shape. Other shapes are envisioned as well. In other instances, the grill frame support and bowl may be a unitary structure.

In addition, like the ring 104, the grill frame support 204 may include a number of bearing brackets 228 extending from an internal diameter of the grill frame support 204 into the aperture of the grill frame support 204. The grill frame support 204 further may include a number of bearings 220, which may include any suitable bearing capable of enabling the grill frame 210 to rotate about the grill frame support 204. The bearings 220 may include any suitable bearing capable of enabling the grill frame 210 to rotate about the grill frame support 204. For example, the bearings 220 may be ball bearings or the like. In some instances, the bearing brackets 228 may extend from a lower edge of the grill frame support 204 such that the top side of the grill frame 210 is substantially flush with the top side of the grill frame support 204 when the grill frame 210 is disposed on the bearings 220.

Figure 19:
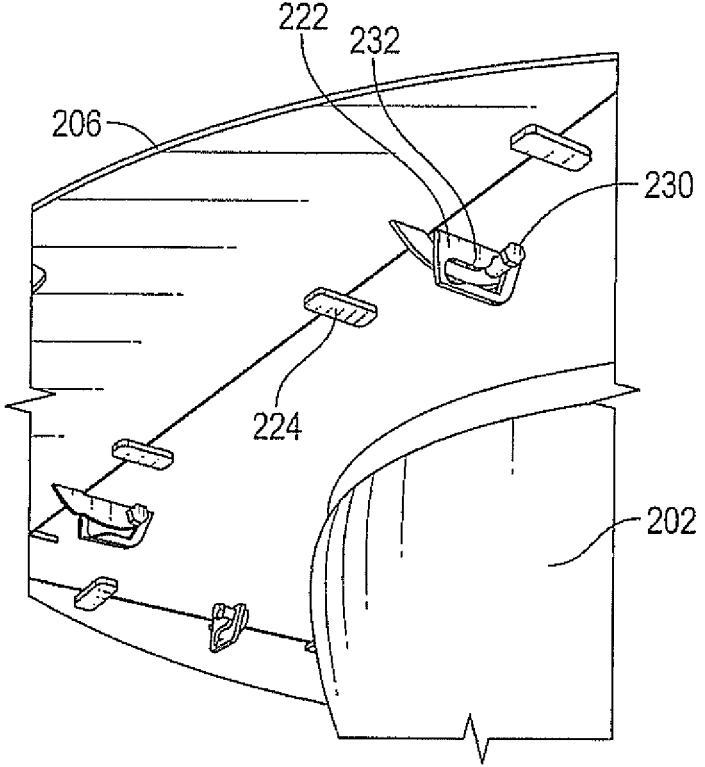
FIG. 19 illustrates an exemplary shelf lock mechanism constructed in accordance with one or more embodiments of the disclosure.

As shown in FIG. 18, the outer perimeter of the grill frame support 204 may have a square/rectangular shape. In addition, the grill frame support 204 may include a number of shelf brackets 222 and ledges 224 along the outer perimeter. For example, the shelf brackets 222 and ledges 224 may extend outward away from the grill frame support 204. In certain embodiments, the shelf brackets 222 and the ledges 224 may extend from a lower portion of the grill frame support 204. As shown in FIG. 19, the ledges 224 may extend beyond the outer perimeter of the grill frame support 204; whereas, the shelf brackets 222 may not extend beyond the outer perimeter of the grill frame support 204. The vertical space between the upper surface of the ledges 224 and the upper surface of the grill frame support 204 may be sized and shaped to accommodate the thickness of the shelf 206.

As shown in FIG. 19, each edge of the grill frame support 204 may include four ledges 224 and two shelf brackets 222, such that a first shelf bracket is positioned in between a first ledge and a second ledge, and a second shelf bracket is positioned between a third edge and a fourth ledge. As will be understood by a person having ordinary skill in the art, a variety of number of ledges and brackets may be used on each edge of the grill frame support. For example, each edge of the grill frame support 204 may include three ledges 224 and two shelf brackets 222, such that a first shelf bracket is positioned in between a first ledge and second ledge, and a second shelf bracket is positioned between the second ledge and third ledge.

As further shown in FIG. 19, the shelf 206 may include pins 230 that are configured to engage slots/holes 232 in the shelf brackets 222. For example, the pins 230 may include a curved portion extending from the lower surface of the shelf 206 in a direction perpendicular to the edge of the grill frame support 204, and a pin portion extending away from the curved portion parallel to the edge of the grill frame support 204. The holes 232 of the shelf brackets 222 may extend parallel to the curved portion of the pins 230, such that the pin portion of the pins 230 may extend through the holes 232 as shown in FIG. 19. The holes 232 may have a non-fitted portion and a fitted portion, such that the shelf 206 may transition from a retracted position when the pins 230 are engaged with the non-fitted portion of the holes 232 and an expanded position when the pins 230 are engaged with the fitted portion of the holes 232. In this manner, the shelf 206 is configured to be disposed on top of the ledge 224 when the pins 230 are engaged with the fitted portion of the holes 232 and the shelf 206 is secured to and planar with the grill frame support 204. Accordingly, to retract the shelf 206, the outer edge of the shelf 206 may be lifted upward relative to the grill frame support 204, e.g., above the ledges 224, such that the pins 230 disengage with the fitted portion of the holes 232 and are positioned within the non-fitted portion of the holes 232. The shelf 206 may then be pulled radially away from the grilled frame support 204 such that the inner edge of the shelf 206, e.g., the edge of the shelf 206 parallel to the outer edge of the grill frame support 204, is positioned beyond the ledges 224, and the shelf may fold downward relative to the grill frame support 204 via the pins 230 and the holes 232 of the shelf brackets 222.

In some instances, the outer edge of the shelf 206 is arcuate. In other instances, the outer edge of the shelf 206 may be rectangular or trapezoidal. The shelf 206 may be any suitable size, shape, or configuration. In certain embodiments, the shelf 206 may be include a hinge in order to fold a portion of the shelf. The shelf 206 may include a handle 234, as shown in FIG. 15. Any number of shelves may be used herein. For example, the apparatus 200 may include 1, 2, 3, 4, 5, 6, 7, 8, and so on number of shelves.

Figure 24:
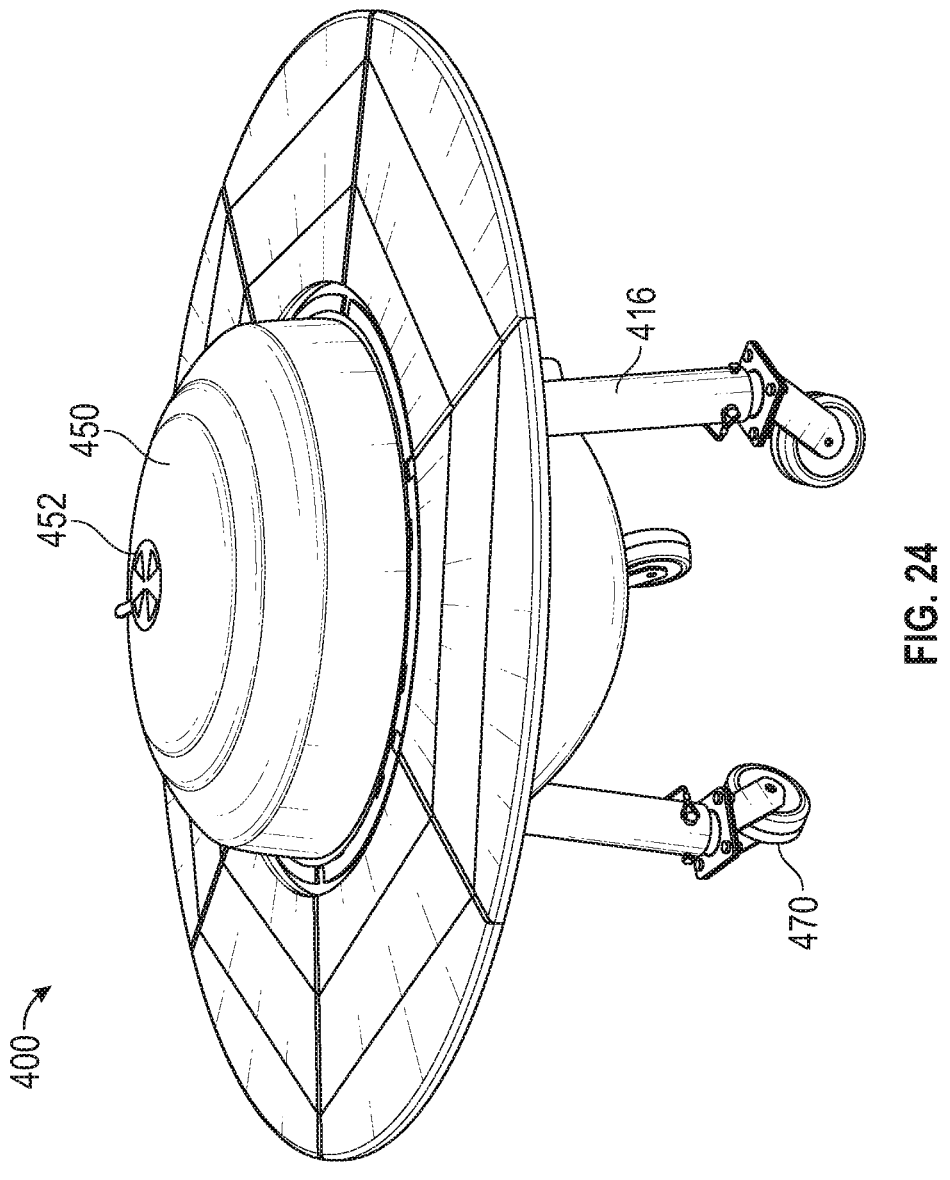
FIG. 24 illustrates the convertible fire pit, grill, griddle, smoker and/or table apparatus of FIG. 23 with the hood in accordance with one or more embodiments of the disclosure.
Figure 25:
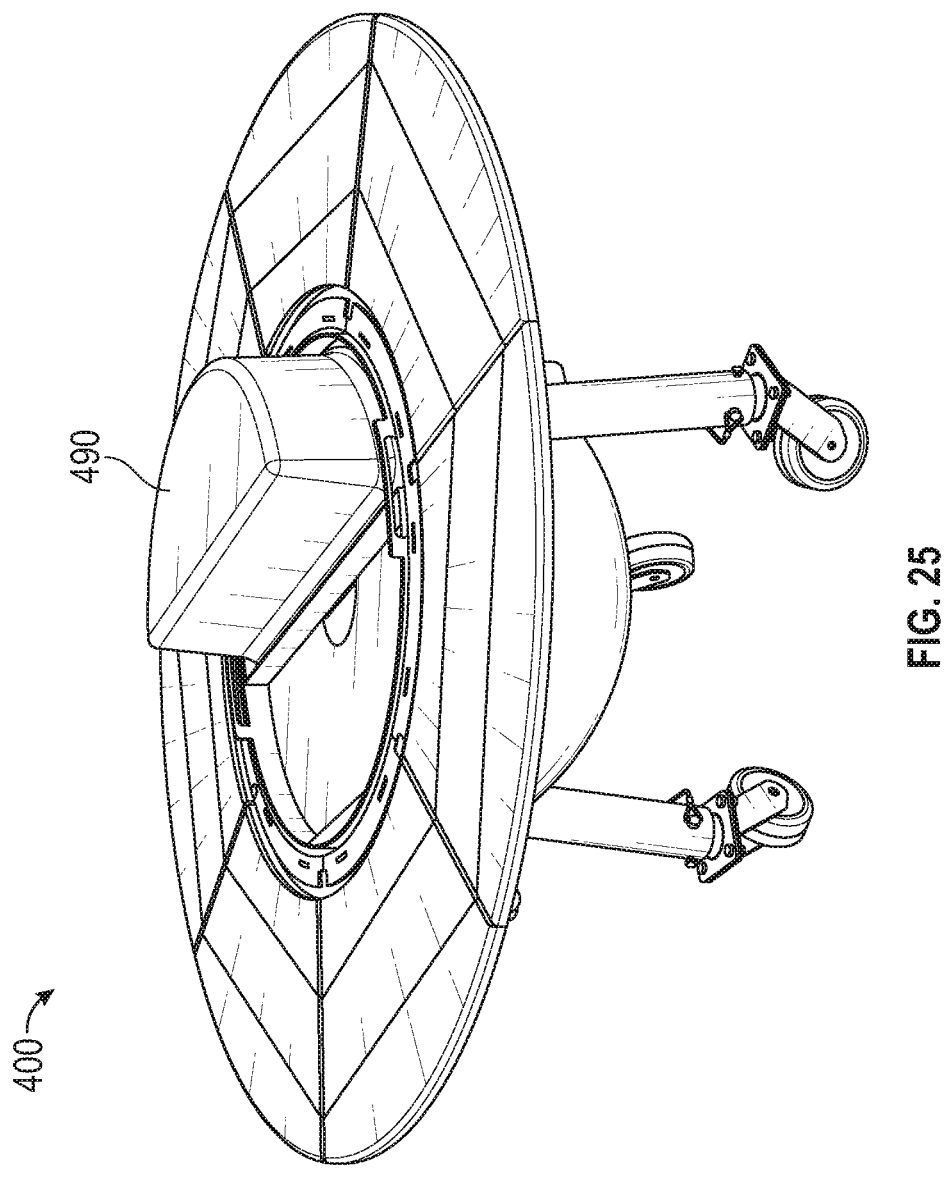
FIG. 25 illustrates the convertible fire pit, grill, griddle, smoker and/or table apparatus of FIG. 23 with the half hood in accordance with one or more embodiments of the disclosure.

Referring now to FIG. 23, another exemplary convertible fire pit, grill, griddle, smoker and/or table apparatus is provided. Apparatus 400 may be constructed similar to the apparatus 100 and 200 described above. For example, as shown in FIG. 24, the apparatus 400 may include a grill hood 414 having a ventilation port 452. Moreover, as shown in FIGS. 24 and 26, the apparatus 400 may include a bowl 402 having a support 416, e.g., one or more legs, and a port 418 for providing an air flow into the bowl 402, which may be constructed similar to the bowl 102 having the support 116 and the port 118. As shown in FIG. 26, port 418 may include a port valve 419. Port valve 419 may be rotated in order to increase or decrease the cross-sectional area of the port opening. Increasing or decreasing the cross-sectional area of the port opening allows more control over the amount of air flow into the bowl.

In addition, like the ring 104, the grill frame support 404 may include a number of bearing brackets 428 extending from an internal diameter of the grill frame support 204 into the aperture of the grill frame support 404. The grill frame support 404 further may include a number of bearings 420, which may include any suitable bearing capable of enabling the grill frame 410 to rotate about the grill frame support 404. The bearings 420 may include any suitable bearing capable of enabling the grill frame 210 to rotate about the grill frame support 204. For example, the bearings 420 may be ball bearings or the like. In some instances, the bearing brackets 428 may extend from a lower edge of the grill frame support 404 such that the top side of the grill frame 210 is substantially flush with the top side of the grill frame support 204 when the grill frame 210 is disposed on the bearings 220. The grill frame 410 has a horizontal bottom surface resting on the bearings 420.

Referring to FIG. 28, the ring 404 and the bowl 402 may be constructed similarly to ring 104 and bowl 102. The ring 404 may have one or more bushings 421 disposed one each of the bearing brackets 428. The bushing 421 may include any suitable bushing capable of enabling the grill frame 410 to rotate about the ring 404. In some instances, the bushing 421 may include a number of roller bushings. The bushing 421 allows the grill frame 410 to rotate while experiencing less friction by preventing the grill frame from sliding along an inner surface of the ring 404. The bushing 421 also allows the grill frame 410 to maintain its rotation about a vertical axis concentric with the center of the ring 404 by rolling against a vertical surface of the grill frame 410.

Figure 20:
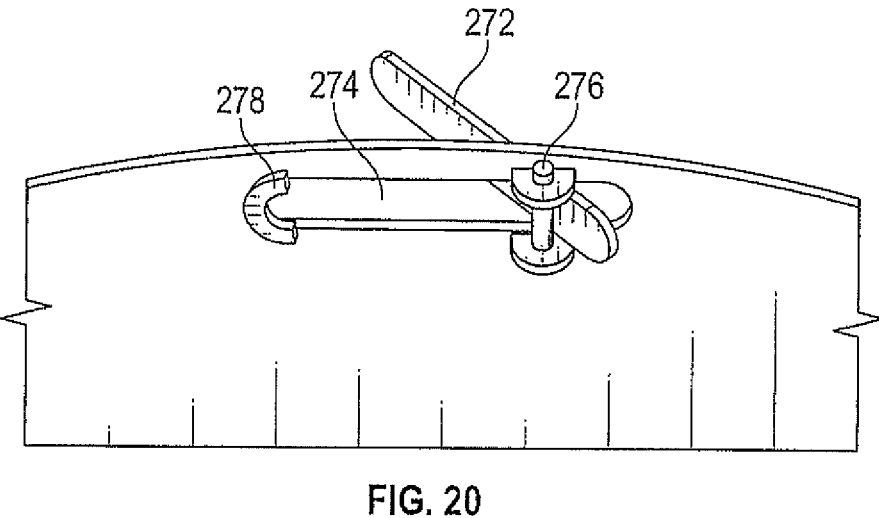
FIG. 20 illustrates an exemplary handle constructed in accordance with one or more embodiments of the disclosure.

Referring now to FIG. 20, an exemplary handle configuration is described. The handle may include a handle portion 272 pivotally attached to an aperture 274 via a hinge 276. The aperture 274 may be sized and shaped to receive the handle portion 272. In addition, the handle may include a lip 278 extending from a lower surface of the handle, the lip 278 sized and shaped to engage with at least a portion of the handle portion 272. The lip 278 and the hinge 276 may be disposed on opposite sides of the aperture 274. In addition, the vertical space of the aperture 274 may be sized and shaped to accommodate the thickness of the handle portion 272. Thus, when the handle portion 272 is resting on the lip 278 within the aperture 274, the handle portion 272 is substantially flushed with the handle. The handle described herein may replace any of the handles described above. For example, the handle may be integrated with the shelves, the grill frames, the grill components, the grill hoods, the grates, etc., described above. Accordingly, when the handle portion 272 is resting on the lip 278 within the aperture 274, the handle portion 272 is substantially flushed with the top surface of the corresponding component.

The apparatus 400 may differ from the apparatus 100 and 200 in that the apparatus 400 may include an aperture 475 and an aperture cover 473 in grill component 412 for draining grease as shown in FIGS. 29A and 29B. FIG. 29A shows the aperture cover 473 in the open position. In the open position, the aperture cover 473 exposes the aperture 475. Grease that has accumulated in the grilling component 412 may drained through the aperture 475 while the aperture is exposed. FIG. 29B shows the aperture cover 473 in the closed position. In the closed position, the aperture cover 473 prevents grease from draining through the aperture 475. While FIGS. 29A and 29B show a semicircular aperture and aperture cover located near the center of the grill component, one skilled in the art would understand that the aperture and aperture cover may be any suitable shape and in any suitable location.

Figure 27:
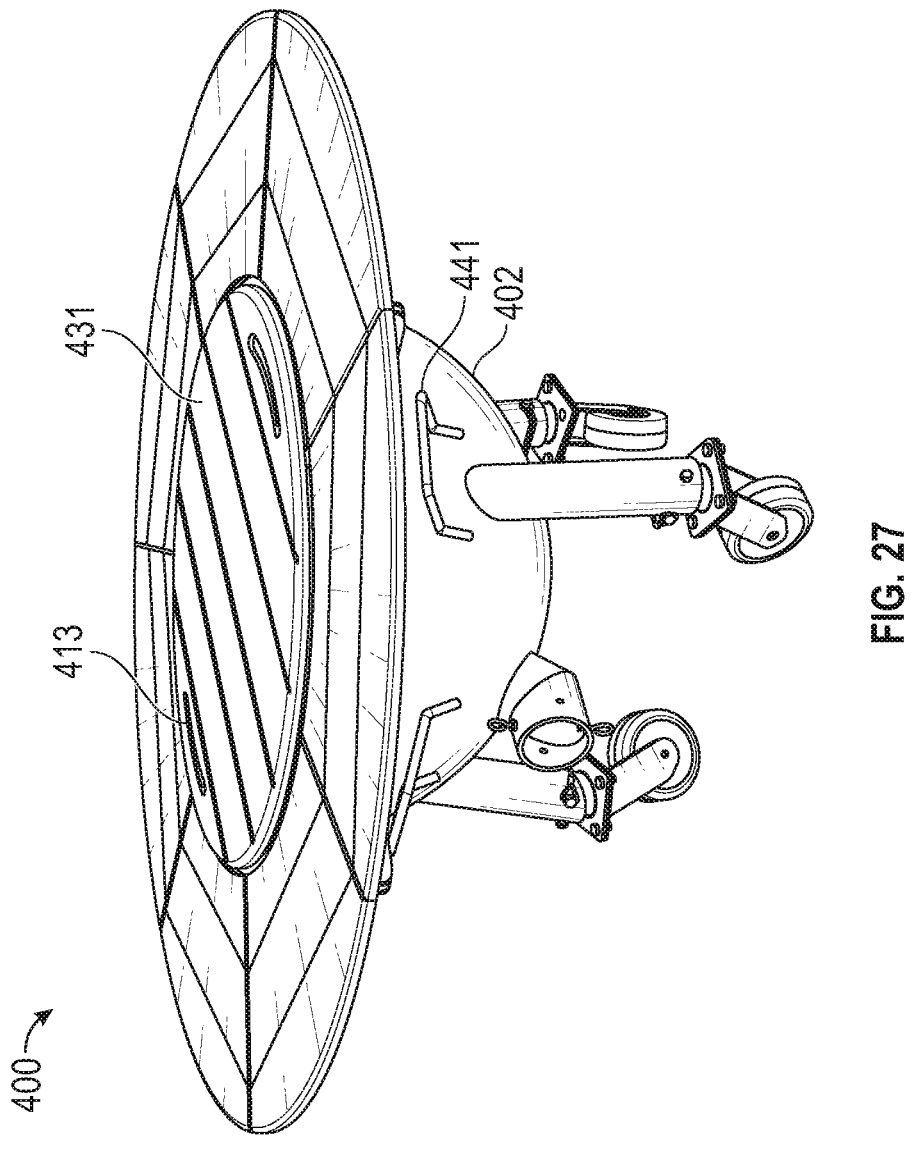
FIG. 27 illustrates the convertible fire pit, grill, griddle, smoker and/or table apparatus of FIG. 23 with the table top in accordance with one or more embodiments of the disclosure.

Moreover, the apparatus 400 may differ from the apparatus 100 and 200 in that the apparatus 400 may include a table top component 431 as shown in FIG. 27. The table top 431 may rest on the grill frame 410 in place of the grilling component 412. The table top 431 may have one or more apertures corresponding to the grill frame handles 413. As the table top 431 rests on the grill frame 410, the grill frame handles 413 insert into the table top apertures. The table top 431 has a thickness that allows the tops of the grill frame handles 413 to not extend past the top of the table top. The top of the grill frame handles 413 may be below or substantially even with the top of the table top 431 while the table top is resting on the grill frame 410.

Figure 31:
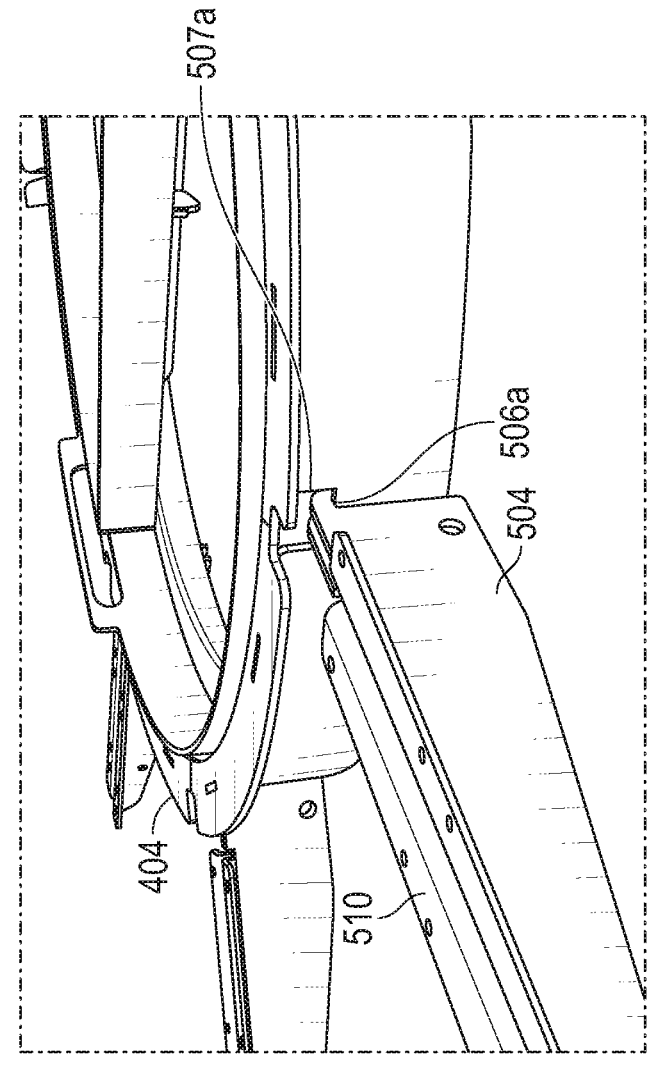
FIG. 31 is a perspective view of a sectional mounting system without the wings in accordance with one or more embodiments of the disclosure.
Figure 32:
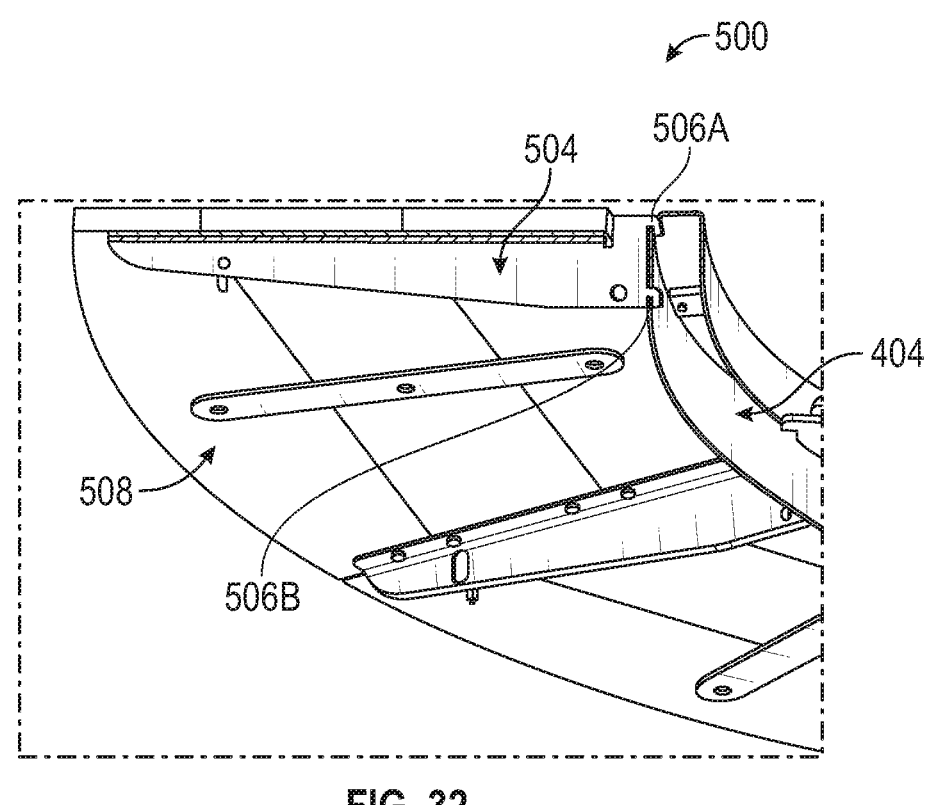
FIG. 32 is an upward view of a sectional mounting system in accordance with one or more embodiments of the disclosure.
Figure 33:
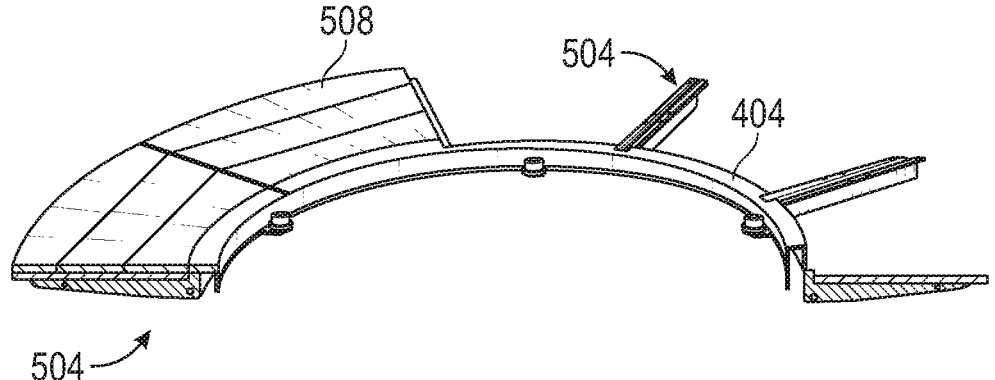
FIG. 33 is a downward view of a sectional mounting system in accordance with one or more embodiments of the disclosure.
Figure 34:
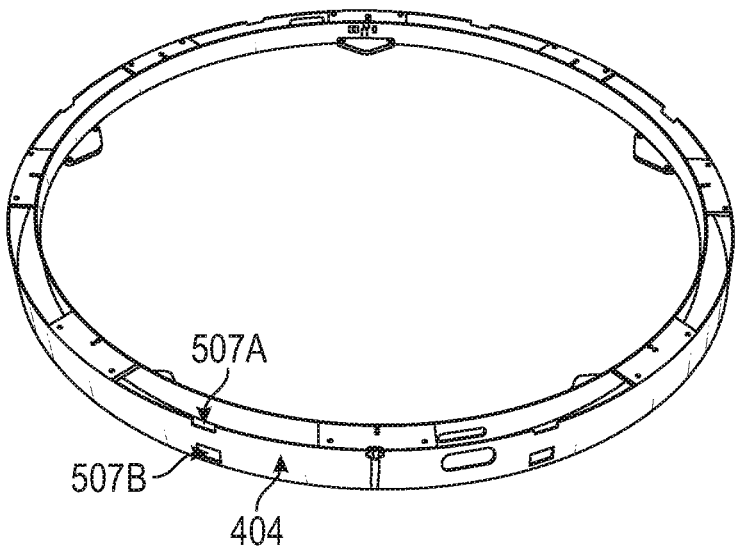
FIGS. 34-35 are views of an inner ring in accordance with one or more embodiments of the disclosure.
Figure 35:
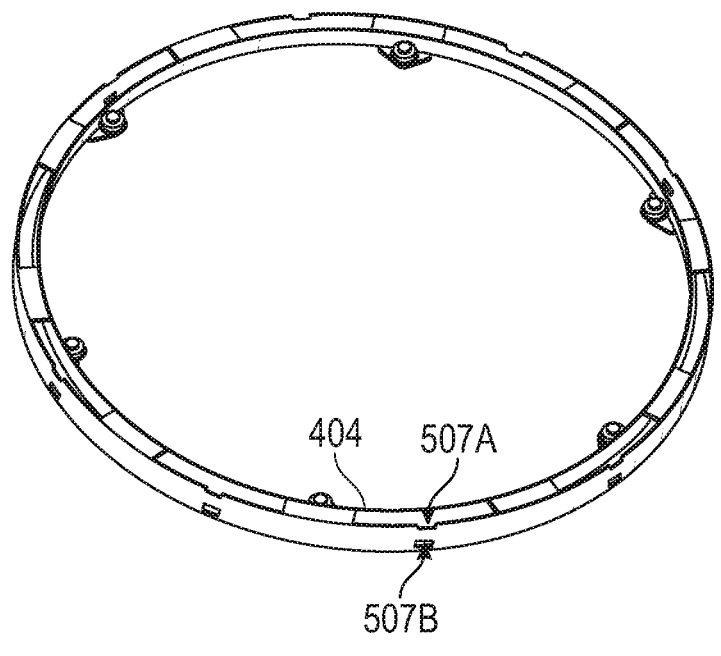
Figure 39A:
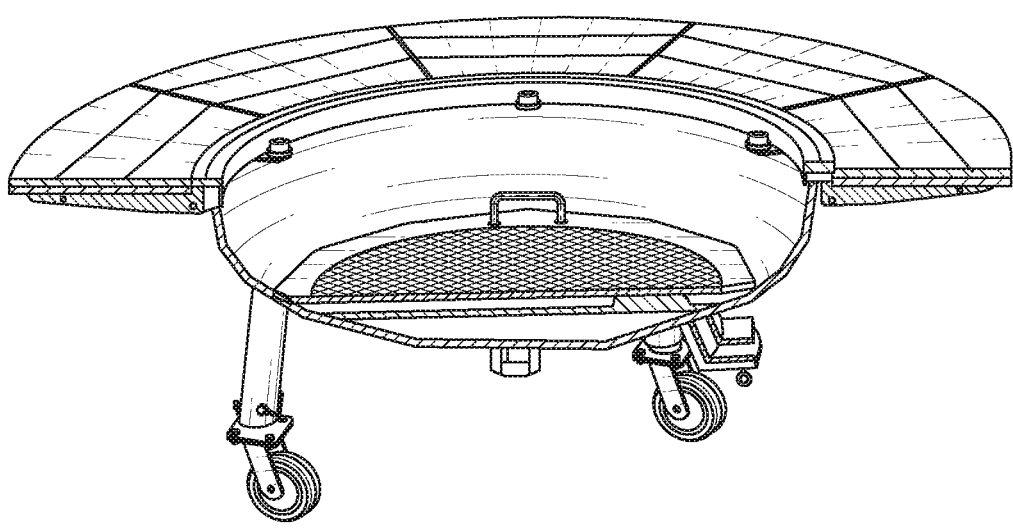
FIGS. 39A-39F are views of sectional mounting system on an apparatus in accordance with one or more embodiments of the disclosure.
Figure 39B:
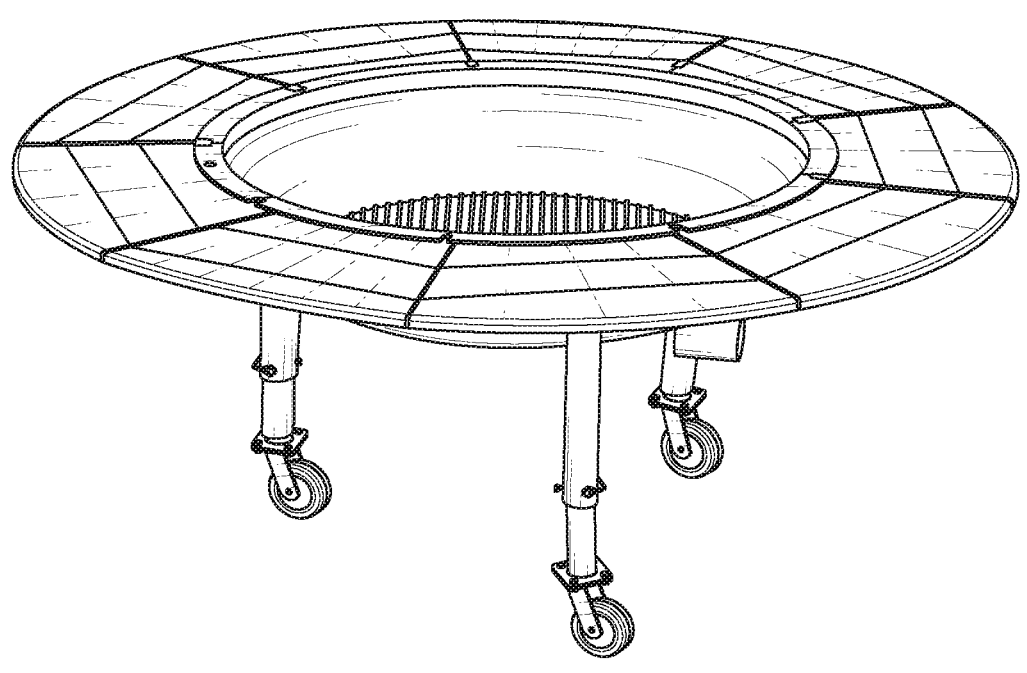
Figure 39C:
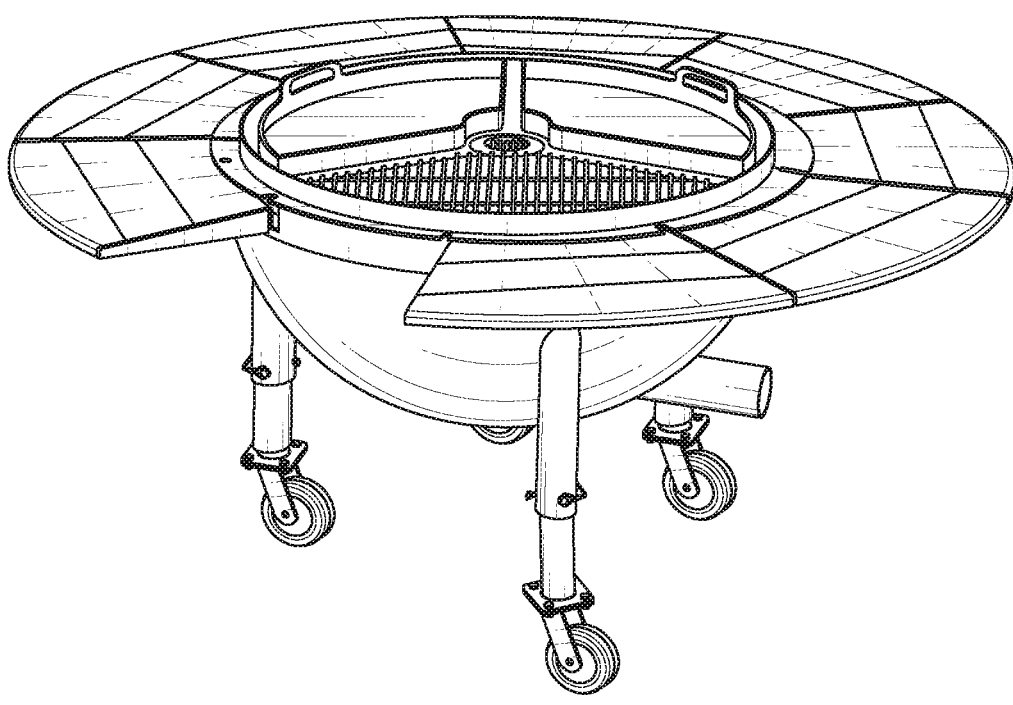
Figure 39D:
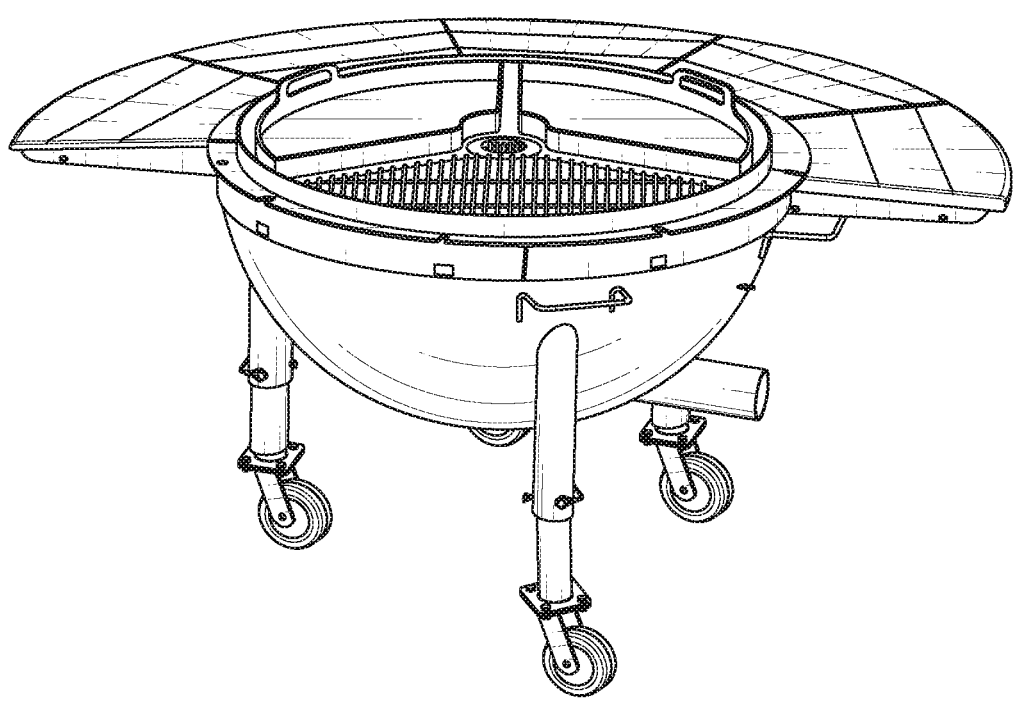
Figure 39E:
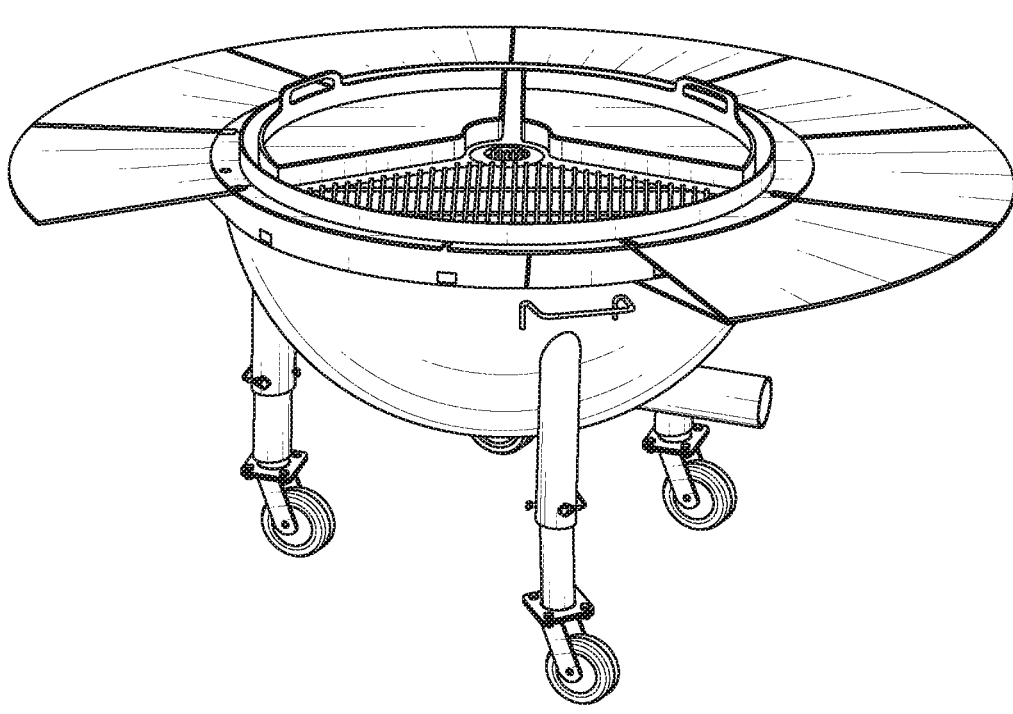
Figure 39F:
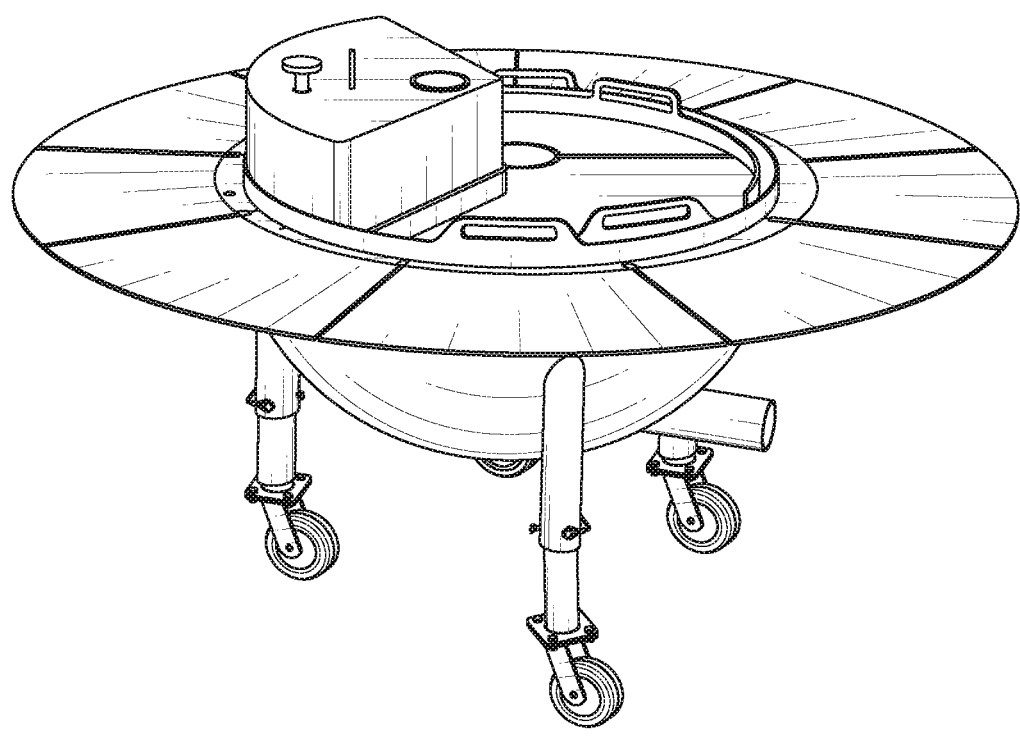

Further, the apparatus 400 may differ from the apparatus 100 and 200 in that the apparatus 400 may include a grill frame support 404 instead of the ring 104, as shown in FIGS. 28, 31, and 32. Grill frame support 404 has a sectional mounting system 500 in place of the shelf 106. The sectional mounting system 500 includes the grill frame support 404 and sectional wings 508 mounted thereupon. The sectional wings 508 attach to the grill frame support 404 via brackets 504 with a first bracket hook 506A and an optional second bracket hook 506B, shown in FIG. 32, thereupon. The sectional mounting system 500 allows for the customizable configuration of multiple sectional wings 508 to be mounted upon the grill frame support 404. FIG. 39C and FIG. 39D show a version of apparatus 400 with 8 and 5 sectional wings respectively.

The grill frame support 404 may have a recess 507A and an optional aperture 507B disposed thereon. The aperture 507B may be disposed on the lower side of the grill frame support 404 and the recess 507A may be disposed proximate the top edge of the grill frame support 404. The recess 507A may instead be an aperture set in the grill frame support 404 above the aperture 507B. As previously mentioned, both the second hook 506B and the aperture 507B are optional. In one embodiment, sectional mounting system 500 includes brackets having only the first hook 506A which is configured to engage the recess 507A as shown in FIG. 31. In another embodiment, sectional mounting system 500 includes brackets having both the first hook 506A and the second hook 506B which are configured to engage the recess 507A and the aperture 507B respectively.

Figure 36:
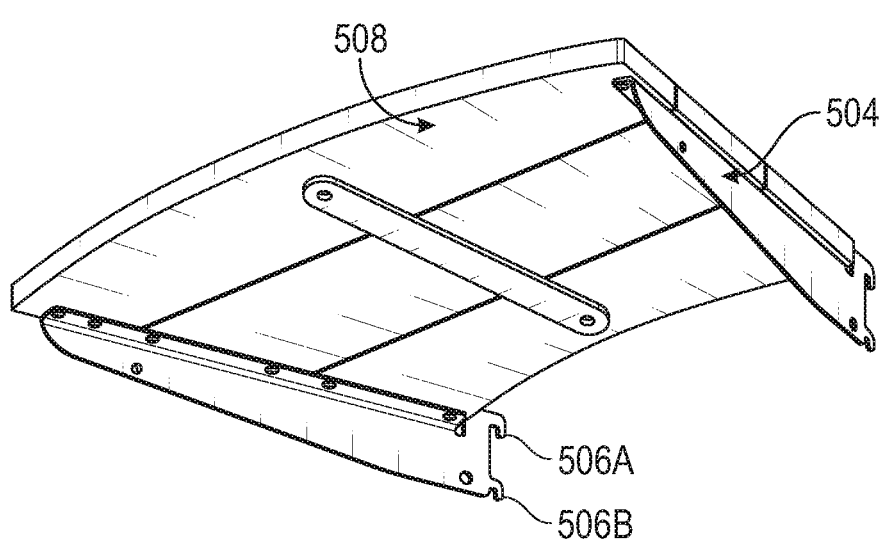
FIGS. 36, 37, 38A, and 38B are views of a sectional wing in accordance with one or more embodiments of the disclosure.
Figure 37:
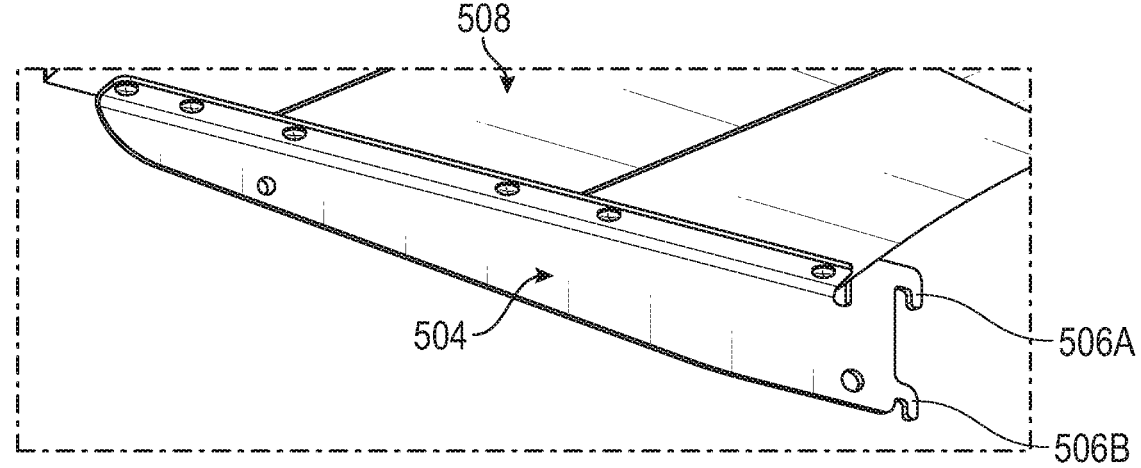
Figure 38A:
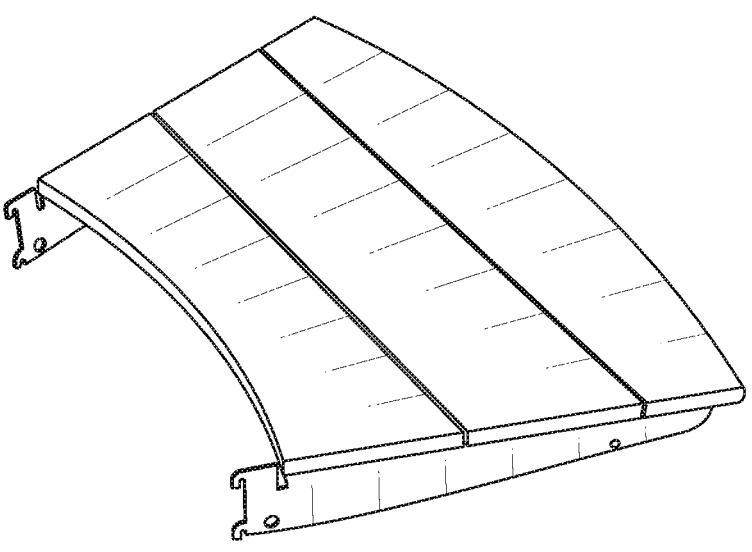
Figure 38B:
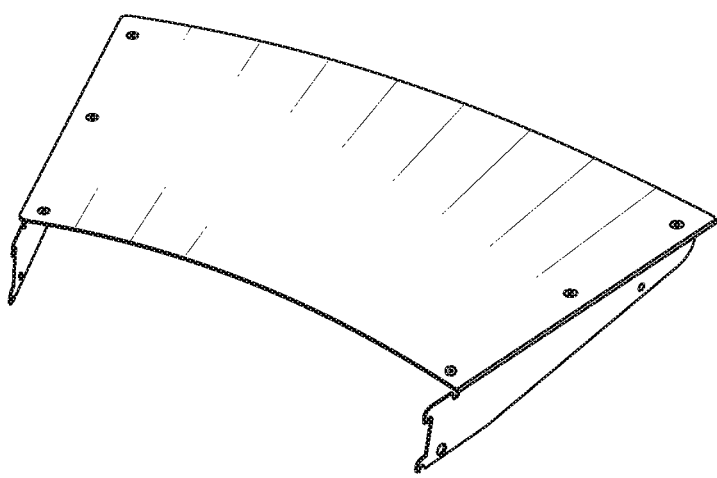

The sectional wings 508, as shown in FIGS. 36 and 37, have brackets 504 mounted thereupon. The brackets 504 have a first hook 506A configured to fit within the recess 507A. The first hook 506A may catch on a portion of the recess 507A in order to secure the bracket 504, and thereby the sectional wings 508, onto the grill frame support 404. The sectional wings 508 may be wooden as in FIG. 38A or may be metal as in FIG. 38B. The sectional wings 508 may be individually removable, as shown by FIGS. 39C and 39D. The sectional wings 508 can also be replaced by other sectional accessories such as smaller sections, sections with trays, or sections with other desirable grill accessories.

Figure 21:
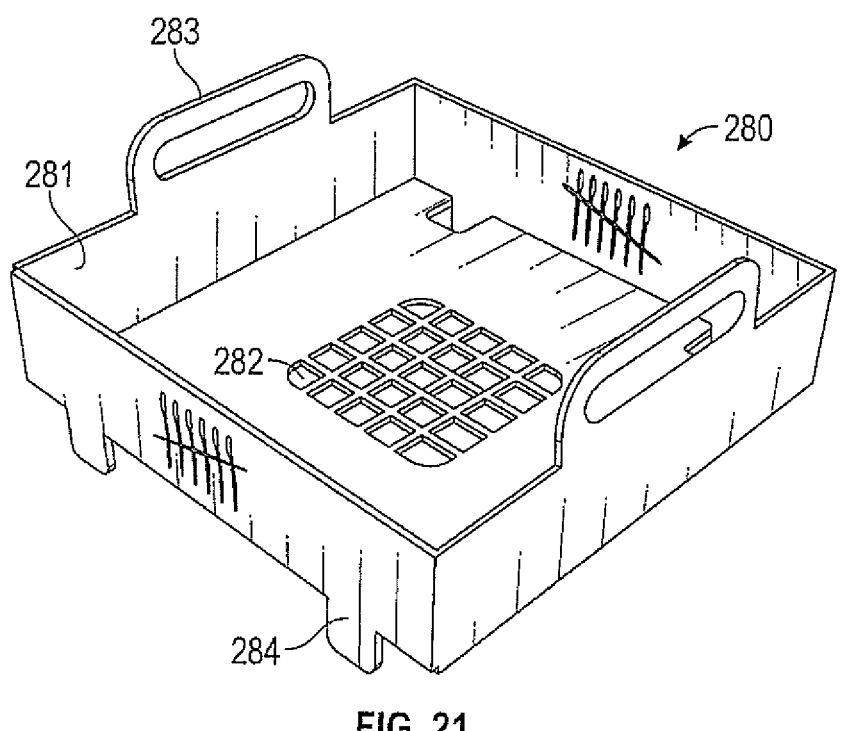
FIG. 21 illustrates an exemplary firebox constructed in accordance with one or more embodiments of the disclosure.

Referring now to FIG. 21, an exemplary fire box 280 is provided. The fire box 280 may be sized and shaped to fit within the bowl 202, and may have a plurality of walls 281 for containing, e.g., fire wood or coal. As shown in FIG. 21, the floor of the fire box 280 may include a plurality of holes 282 to provide ventilation as well as receive debris therethrough. The fire box 280 further may include handles 283 for moving the fire box 280, as well as a plurality of supports 284, e.g., legs, for sitting against the bowl 202.

Figure 22:
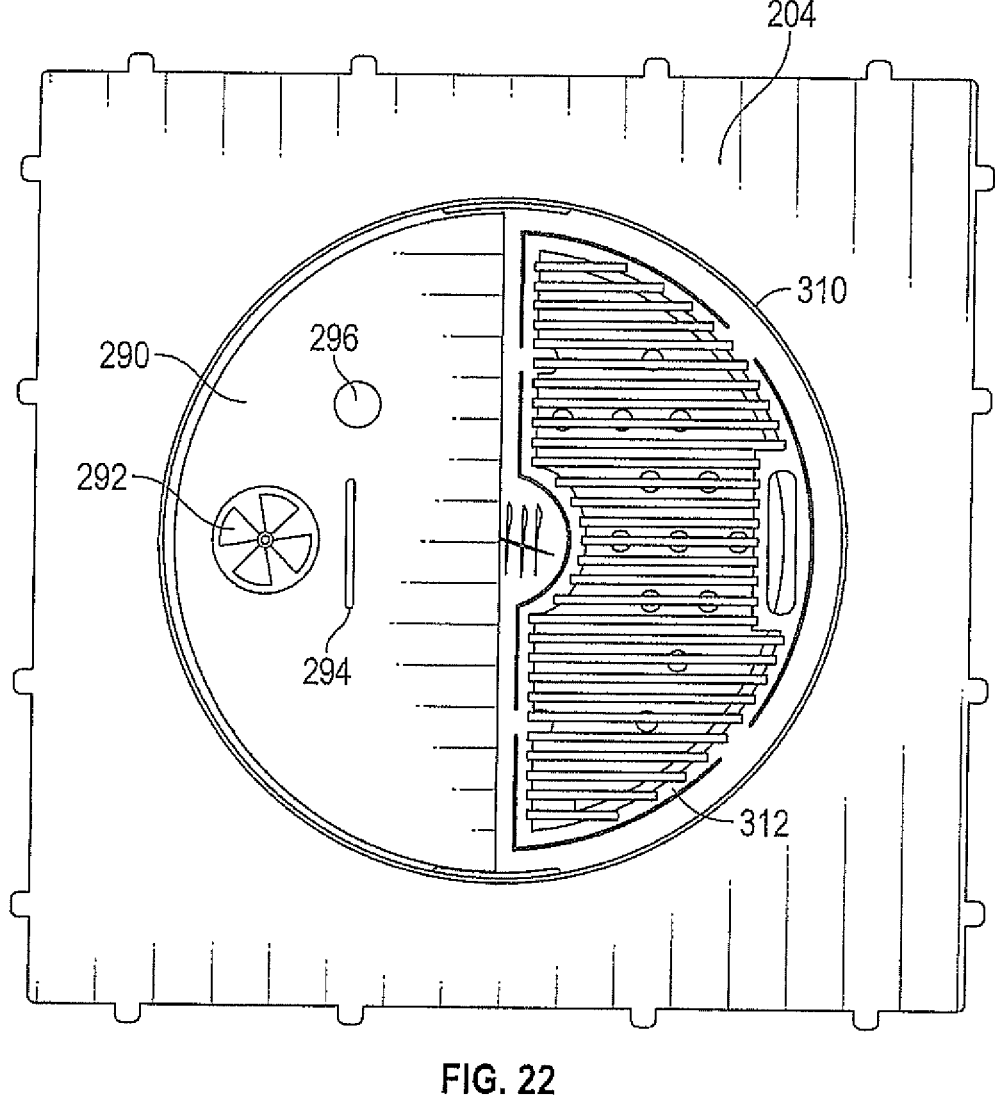
FIG. 22 illustrates an alternative exemplary grill frame, grill components, and grill hood constructed in accordance with one or more embodiments of the disclosure.

Referring now to FIG. 22, an alternative exemplary grill frame, grill components, and grill hood are provided. The grill frame 310 may be constructed similar to the grill frames 110 and 210 described above, except that the grill frame 310 may be constructed to accommodate two grill components 312. For example, the grill components 312 may include two semicircular grill components. Accordingly, as shown in FIG. 22, the corresponding grill hood 290 may have a corresponding semicircular shape. The grill hood 290 may further include a handle 294, a ventilation port 292 (such as a daisy vent or the like), and/or a thermometer 296. Although FIG. 22 depicts the grill frame 310 in use with the grill frame support 204, it will be understood that the grille frame 310 may be used with the ring 104 of apparatus 100.

Figure 40A:
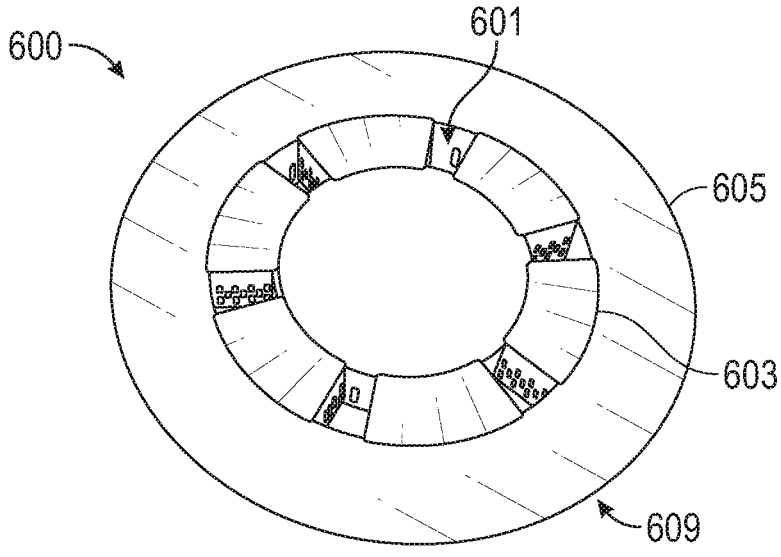
FIGS. 40A-40C are perspective views of a bioethanol fuel container in accordance with one or more embodiments of the disclosure.
Figure 40B:
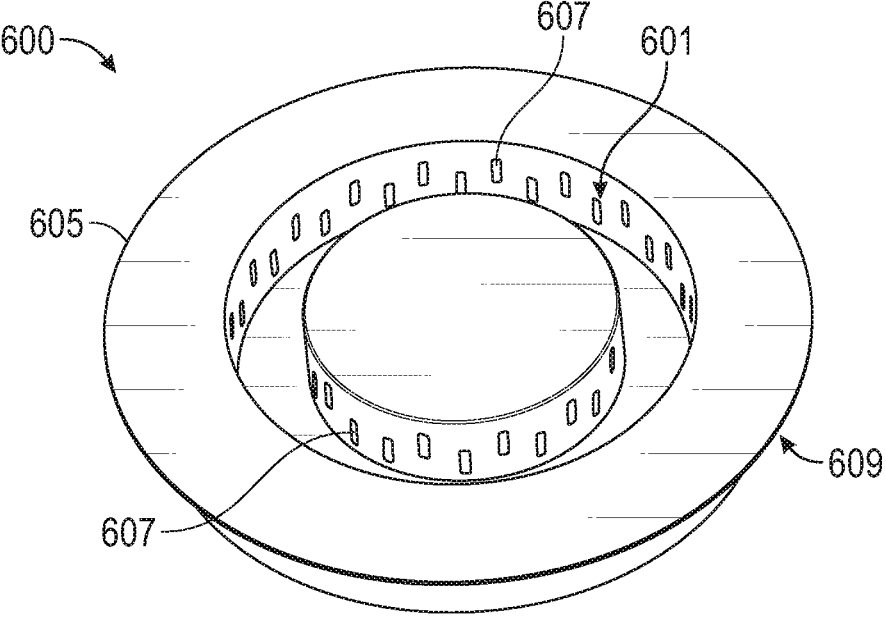
Figure 40C:
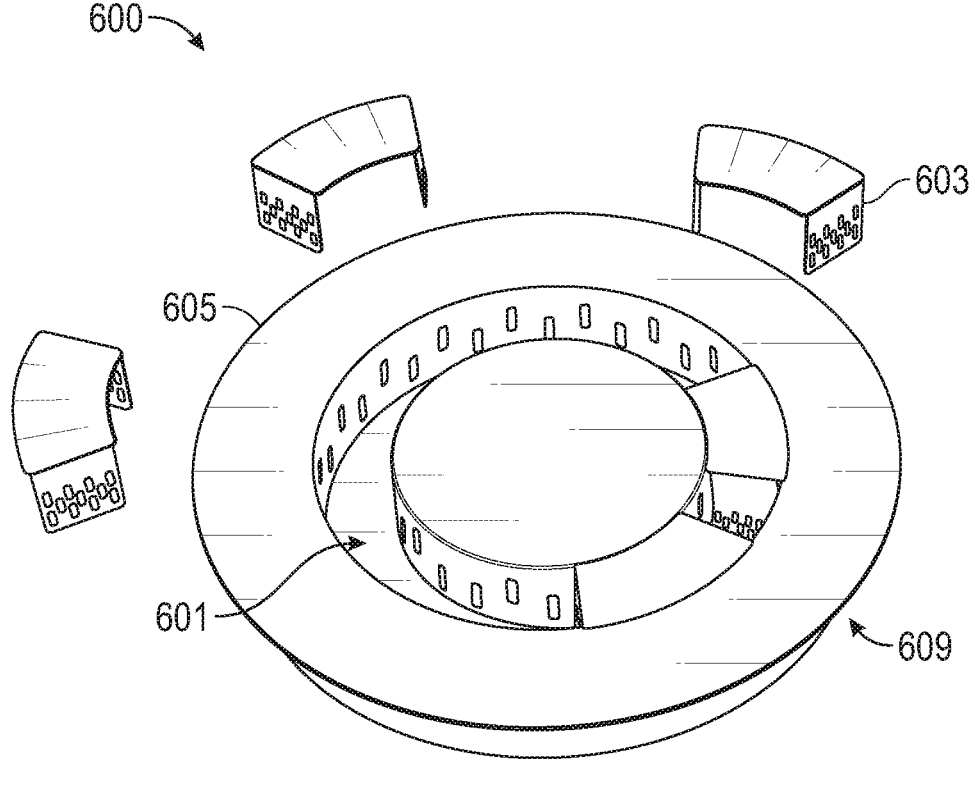

Referring now to FIGS. 40A, 40B, and 40C, a bioethanol fuel insert 600 is provided. The bioethanol fuel insert 600 is an additional component configured to be inserted into the bowl 102, 202, 402 in place of the grilling component. The bioethanol fuel insert 600 includes a lip 605 having an undersurface 609. As the bioethanol fuel insert 600 rests in the bowl, the undersurface 609 may rest on the bearings 420. Alternatively, the undersurface 609 may rest on the ring 404 or any other suitable location. The bioethanol fuel insert 600 includes chamber 601 configured to hold a bioethanol fuel for smokeless burning. The bioethanol fuel insert 600 includes a plurality of apertures 607 that provide airflow to burning fuel. As the fuel is burning, restriction inserts 603 may be placed within the chamber 601 in order to reduce the speed at which the bioethanol fuel is burned. The restriction inserts 603 restrict the airflow to the fuel.

Figure 41A:
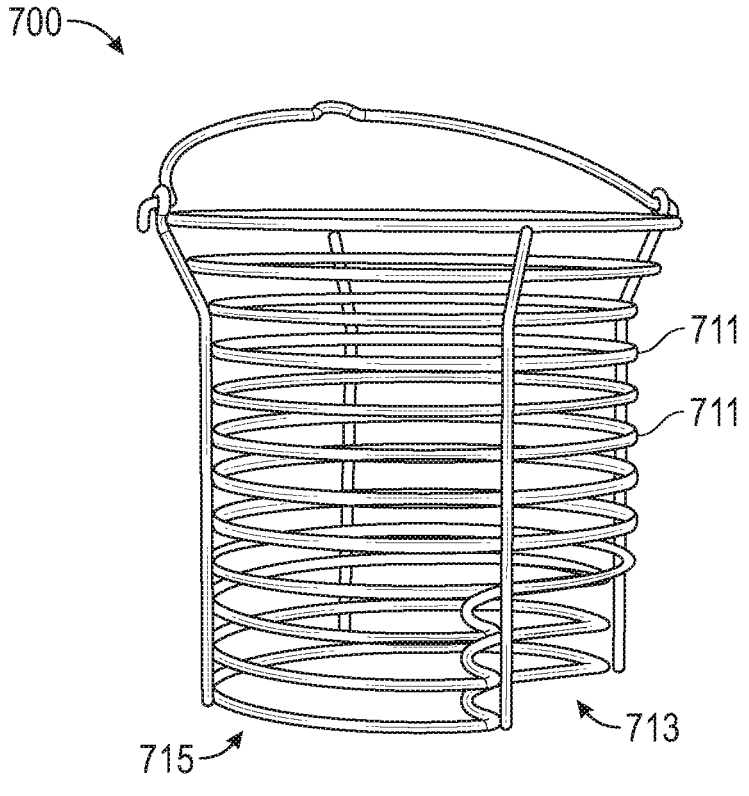
FIGS. 41A and 41B are perspective views of a coal starter stack in accordance with one or more embodiments of the disclosure.
Figure 41B:
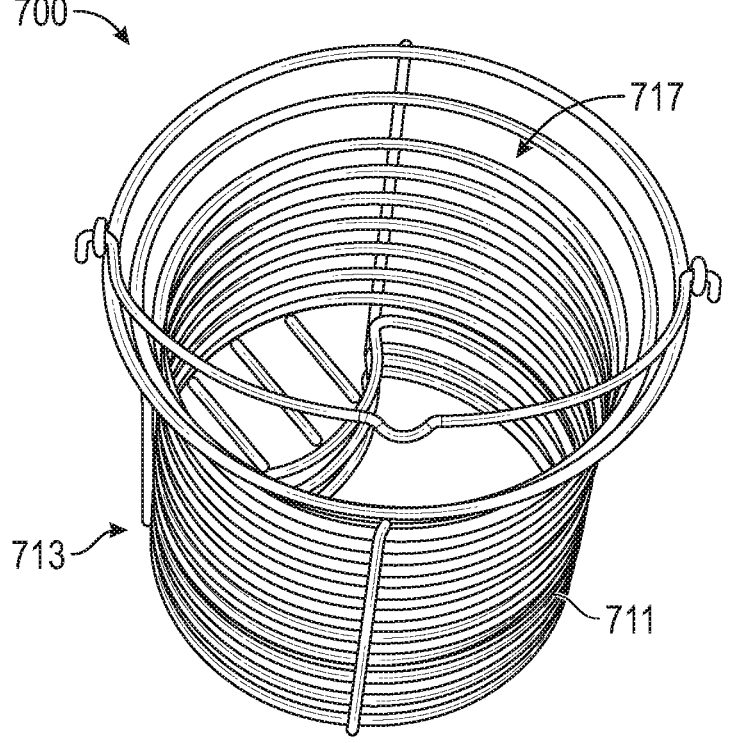

Referring now to FIGS. 41A and 41B, a coal starter stack 700 is provided. The coal starter stack 700 is an additional component configured to be inserted into the bowl 102, 202, 402 before the grilling component in order to properly light the coal or charcoal before using the grilling component. The fuel may be inserted into top opening 717. Optionally, a fuel and/or fire starter may be placed in recess 713. The coal starter stack 700 may include several retaining bars 711. The retaining bars 711 help to retain the fuel within the coal starter stack 700. The retaining bars 711 may also be used as a method of measurement. A user may fill the coal starter stack 700 with fuel up to a particular retaining bar 711 depending on how hot or how long they wish the grill to burn for. Once the fuel has begun to properly burn, the user may lift the coal starter stack 700 out of the bowl. As the coal starter stack 700 is being lifted out of the bowl, the fuel will fall through the bottom opening 715 so that the fuel will remain in the bowl.

Figure 42:
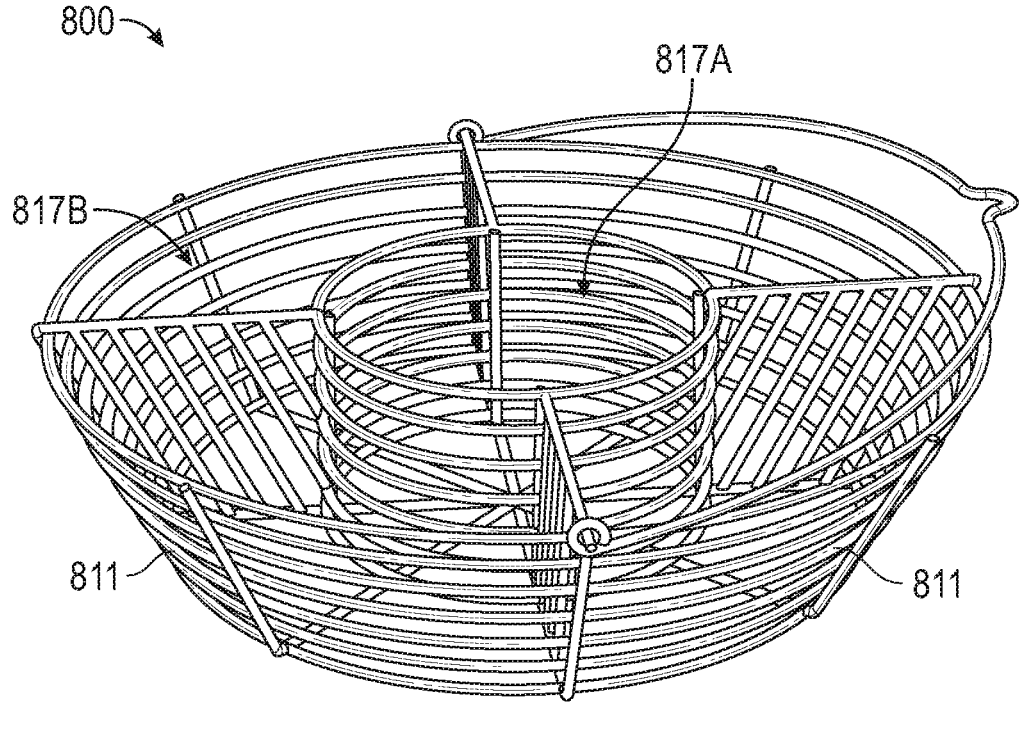
FIG. 42 is a perspective view of a charcoal maze basket in accordance with one or more embodiments of the disclosure.

Referring to FIG. 42, a charcoal maze basket 800 is provided. The charcoal maze basket 800 may include one or more center sections 817A and one or more outer sections 817B for fuel to be placed in. Each center section 817A and outer section 817B may include multiple retaining bars 811 in order to retain the fuel. The retaining bars 811 may also be used as a method of measurement by filling one or more of the sections up to a certain retaining bar 811 with fuel. The charcoal maze basket 800 is configured to burn the fuel over a specific amount of time based on which section 817A, 817B are filled with fuel and how much fuel they are filled with.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A convertible fire pit, grill, griddle, smoker and table apparatus, the apparatus comprising:
    a bowl;
    a grill frame support positionable about the bowl, the grill frame support comprising a circular aperture;
    one or more wings removably coupled to an outer edge of the grill frame support;
    a grill frame positionable about the grill frame support, the grill frame configured to rotate about the grill frame support, wherein the grill frame comprises a radially inward facing surface;
    one or more grill components positionable about the grill frame, wherein the one or more grill components rotate with the grill frame, wherein the grill frame and the one or more grill components rotate relative to the bowl.

2. The apparatus of claim 1, wherein the grill frame further comprises:
    a plurality of bearing brackets disposed on the radially inward facing surface; and
    a plurality of bearings disposed on the plurality of bearing brackets.

3. The apparatus of claim 2, wherein the grill frame further comprises a plurality of bushings disposed on the plurality of bearing brackets, and wherein the plurality of bushings and the plurality of bearings are configured to allow the grill frame to rotate about a vertical axis concentric with a center of the grill frame support.

4. The apparatus of claim 2, wherein the plurality of bearings are ball bearings.

5. The apparatus of claim1, further comprising one or more grill hoods configured to be disposed above the one or more grill components.

6. The apparatus of claim 1, wherein the one or more grill components comprise interchangeable cooking surfaces having different cooking surface patterns.

7. The apparatus of claim 6, wherein at least one cooking surface of the interchangeable cooking surfaces comprises a grease aperture and a grease aperture cover.

8. The apparatus of claim 1, wherein the one or more grill components comprise a table top.

9. The apparatus of claim 8, wherein the grill frame further comprises one or more grill frame handles, wherein the table top comprises one more table apertures configured to receive the one or more grill frame handles, and wherein a top of the one or more grill frame handles is substantially planar with a top of the table top.

10. A convertible fire pit, grill, griddle, smoker and table apparatus, the apparatus comprising:

a bowl;

a ring positionable about the bowl, the ring comprising an aperture;

one or more shelves removably coupled to an outer edge of the ring;

a grill frame positionable within the ring, the grill frame configured to rotate about the ring, wherein the grill frame comprises an internally facing surface;

one or more grill components positionable about the grill frame, wherein the one or more grill components rotate with the grill frame, wherein the grill frame and the one or more grill components rotate relative to the bowl.

11. The apparatus of claim 10, wherein the grill frame further comprises:

a plurality of bearing brackets disposed on the radially inward facing surface; and a plurality of bearings disposed on the plurality of bearing brackets.

12. The apparatus of claim 11, wherein the grill frame further comprises a plurality of roller bushings disposed on the plurality of bearing brackets, and wherein the plurality of roller bushings and the plurality of bearings are configured to allow the grill frame to rotate about a vertical axis concentric with a center of the ring.

13. The apparatus of claim 10, further comprising one or more grill hoods configured to be disposed above the one or more grill components.

14. The apparatus of claim 11, wherein the plurality of bearings are ball bearings.

15. The apparatus of claim 10, wherein the one or more grill components comprise interchangeable grates having different grate patterns.

16. The apparatus of claim 10, wherein the one or more grill components comprise a table top.

17. The apparatus of claim 16, wherein the grill frame further comprises one or more grill frame handles, wherein the table top comprises one more table apertures configured to receive the one or more grill frame handles, and wherein a top of the one or more grill frame handles is substantially planar with a top of the table top.

18. The apparatus of claim 10, wherein the one or more grill components comprise interchangeable grates having different grate patterns.

19. The apparatus of claim 10, wherein the bowl comprises a port configured to allow airflow into the bowl, and wherein the port comprises a port valve configured to restrict the airflow to the bowl.

20. A convertible fire pit, grill, griddle, smoker and table apparatus, the apparatus comprising:

a bowl;

a grill frame support positionable about the bowl, the grill frame support comprising:

a circular aperture; and one or more recesses disposed on a top edge of the grill frame support; one or more wings comprising at least one hook, wherein the at least one hook is configured to engage with the one or more recesses;

a grill frame positionable about the grill frame support, the grill frame configured to rotate about the grill frame support;

one or more grill components positionable about the grill frame, wherein the one or more grill components rotate with the grill frame.

\* \* \* \* \*